US011776179B2

(12) United States Patent
Petersen

(10) Patent No.: US 11,776,179 B2
(45) Date of Patent: Oct. 3, 2023

(54) RENDERING SCALABLE MULTICOLORED VECTOR CONTENT

(71) Applicant: ADOBE INC., San Jose, CA (US)

(72) Inventor: Scott Edward Petersen, Redwood, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/471,949

(22) Filed: Sep. 10, 2021

(65) Prior Publication Data

US 2023/0081389 A1    Mar. 16, 2023

(51) Int. Cl.
| | | |
|---|---|---|
| G06T 11/40 | (2006.01) | |
| G06T 11/20 | (2006.01) | |
| G06T 1/20 | (2006.01) | |
| G06T 11/00 | (2006.01) | |

(52) U.S. Cl.
CPC .......... *G06T 11/40* (2013.01); *G06T 1/20* (2013.01); *G06T 11/001* (2013.01); *G06T 11/206* (2013.01)

(58) Field of Classification Search
CPC ......... G06T 11/40; G06T 1/20; G06T 11/001; G06T 11/206
See application file for complete search history.

(56) References Cited

U.S. PATENT DOCUMENTS

| | | | | |
|---|---|---|---|---|
| 8,730,252 | B1* | 5/2014 | Moreton | G06T 15/04 345/589 |
| 9,142,056 | B1* | 9/2015 | Baran | G06T 11/001 |
| 10,403,005 | B2 | 9/2019 | Petersen | |
| 2004/0189655 | A1* | 9/2004 | Perry | G09G 5/28 345/582 |
| 2018/0158227 | A1* | 6/2018 | Reshetov | G06T 7/13 |
| 2019/0108657 | A1* | 4/2019 | Petersen | G06T 11/001 |
| 2022/0028037 | A1* | 1/2022 | Skaljak | G06T 15/005 |

OTHER PUBLICATIONS

Non-Final Office Action dated May 24, 2022 in U.S. Appl. No. 17/471,984, 20 pages.
Final Office Action dated Dec. 8, 2022 in U.S. Appl. No. 17/471,984, 33 pages.
Non-Final Office Action dated May 18, 2023 in U.S. Appl. No. 17/471,984, 33 pages.

* cited by examiner

*Primary Examiner* — Sing-Wai Wu
*Assistant Examiner* — Khoa Vu
(74) *Attorney, Agent, or Firm* — SHOOK, HARDY & BACON L.L.P.

(57) ABSTRACT

Embodiments of provide systems, methods, and computer storage media for rendering multicolored vector content using pre-computed scalar fields, such as images or textures. In an example implementation, multicolored vector content is processed to generate a representation of three scalar fields: an unsigned distance field, a field of region IDs, and a color plane (also called a color field or a color texture). These three fields are pre-computed prior to rendering (e.g., outside of a rendering loop), and then subsequently used (e.g., by a GPU as textures) to render an approximation of the multicolored vector content.

20 Claims, 15 Drawing Sheets

RENDERING SCALABLE MULTICOLORED VECTOR CONTENT

BACKGROUND

Vector graphics (also called vector art, vector objects, or vector images) are images described by vector content in a vector graphics format, such as scalable vector graphics (SVG), Windows Metafile (WMF), Encapsulated PostScript (EPS), Portable Document Format (PDF), CorelDRAW (CDR), or Adobe Illustrator (AI). Generally, vector content represents shapes and other geometric primitives (e.g., points, lines, polygons, Bezier curves, text characters) using mathematical descriptions, which allows vector content to specify shapes in a resolution-independent way. As a result, vector graphics can theoretically be scaled to any size without loss of quality. By contrast, raster graphics (e.g., bitmaps) are images that are typically represented with a grid of pixels that store color values, so when raster graphics are magnified, individual pixels can become visible and the image can become visually distorted. Due in part to their resolution-independence, vector graphics are useful in a variety of applications, including in logos, clothing, product packaging, signs, billboards, animation, gaming, and others.

Graphics processing units (GPUs) are often used to render two-dimensional (2D) or three-dimensional (3D) vector graphics. GPUs were originally designed to accelerate graphics rendering and can be used to reduce demands on central processing units (CPUs) by performing operations that would otherwise contribute to CPU load. Accordingly, GPUs are typically implemented with specialized features that facilitate performing common graphics operations efficiently. For example, GPUs often include multiple execution channels that can be used simultaneously for highly parallel processing, as well as one or more application programming interfaces (APIs) that expose the functionality of the GPU to programmers. GPUs have a variety of applications, including in removable graphics cards coupled to a motherboard via a standardized bus (e.g., AGP, PCI, or PCI Express), integrated graphics solutions, and game consoles, to name a few examples.

However, vector content is difficult to render consistently and with good performance on commodity GPU hardware. GPUs are effectively designed for drawing triangles, and most GPUs do not have any built-in functionality that directly represents curves. As result, most GPUs do not have a way to render curves directly. There are various ways to convince a GPU to render curves, but the results are often blurry or require substantial time and computational resources.

SUMMARY

Embodiments of the present invention are directed to rendering multicolored vector content using pre-computed scalar fields, such as images or textures. More specifically, multicolored vector content is processed to generate a representation of three scalar fields: an unsigned distance field, a field of region IDs, and a color plane (also called a color field or a color texture). These three fields are pre-computed prior to rendering (e.g., outside of a rendering loop), and then subsequently used (e.g., by a GPU as textures) to render an approximation of the multicolored vector content.

To render the vector content into a raster image, a processor (e.g., a GPU) initiates a graphics rendering pipeline that determines color values using the pre-computed scalar fields. In an example embodiment, to determine a color value for a particular pixel of the raster image, a plurality of interpolated signed distance values are generated from the perspective of different regions in a neighborhood of the pixel, and the color value is sampled from a portion of the color plane (e.g., a texel) corresponding to the maximum interpolated signed distance value.

To generate each interpolated signed distance value, a signed distance field is generated by pairing unsigned distance values from the unsigned distance field with signs (positive or negative) determined using region identification values from the field of region IDs. For example, a positive or negative sign is assigned to a pixel/texel based on whether a corresponding point is inside (e.g., positive) or outside (e.g., negative) the region of the pixel/texel for which the field is being generated. The signed distance field is then sampled to generate the interpolated signed distance value from the perspective a particular reference region. The process is repeated for each pixel/texel in the neighborhood being interpolated to generate different fields and signed distance values from the perspective of different regions in the neighborhood. The maximum interpolated signed distance value is determined, and the color value is sampled from corresponding a portion (e.g., texel) of the color plane. The process is repeated to determine color values for various pixels of the raster image, and the raster image is output to a display.

Furthermore, some embodiments are directed to scaling up an initial raster image from a lower quality version to a higher quality version, for example, during a zoom operation zooming into the initial raster image. More specifically, edge detection is applied to the initial raster image to detect edges, and three scalar fields are pre-computed based on the detected edges: an unsigned distance field representing distance to a nearest detected edge, an adjacency field representing whether adjacent pixels are considered to be in a common region defined by the detected edges, and a color plane (also called a color field or a color texture) that represents unblended colors sampled from the initial raster image (e.g., based on distance to a detected edge). These three fields are pre-computed prior to scaling (e.g., outside of a rendering loop), and then subsequently used (e.g., by a GPU as textures) to render a scaled version of the initial raster image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
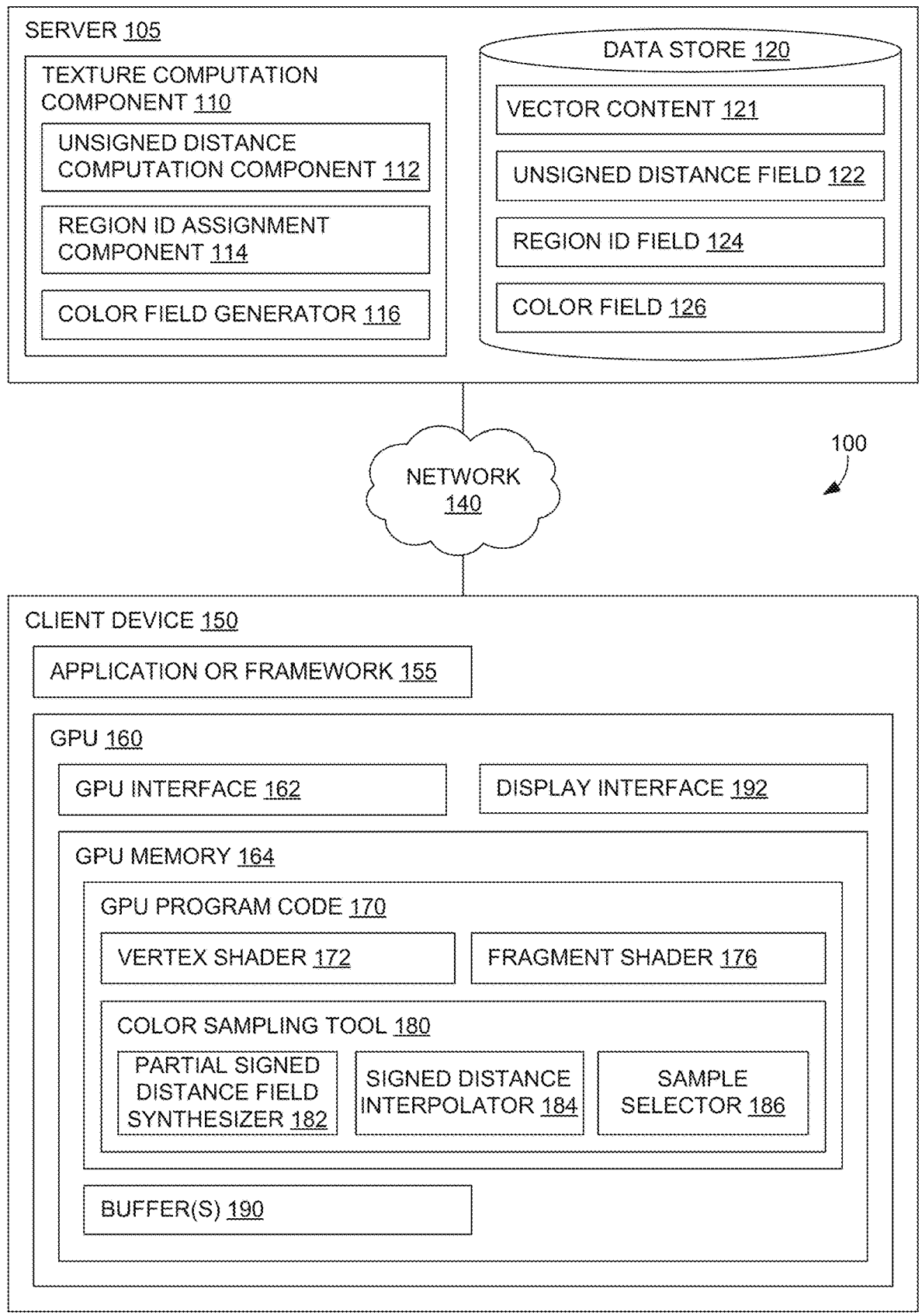
FIG. 1 is a block diagram of an example computing system suitable for rendering multicolored vector content, in accordance with various embodiments.

A number of techniques have been used to render vector content with commodity GPUs. Flattening to textures (i.e., converting vector content to a rasterized image) is a common approach, but rendered edges become aliased or blurry when scaled up and/or perspective projected. Another solution is to tessellate the vector content and use the GPU to fill triangles or other primitives in the tessellated content. However, tessellation results in a fixed amount of detail for a given shape, or needs to be performed over and over as a shape is scaled up in order to retain an acceptable amount of detail. Direct curve filling on a GPU is possible but can be complex and typically involves a fair amount of pre-processing of a shape. In addition to these computational burdens with tessellation and direct curve filling, draw time also scales with the complexity of the set of shapes being rendered.

One prior technique uses signed distance fields (SDFs) in rendering an approximation of multicolored vector content. More specifically, the prior technique converts 2D vector content into a multicolored planar graph (analogous to a map of world countries) that represents each contiguous region in the vector content with a particular color, and represents all regions with four or five colors in a way that no two adjacent regions have the same color. For each of the four or five graph colors, a corresponding SDF is generated as an image that encodes, the distance from each pixel to the nearest pixel of an opposite color. Additionally, for each of the four or five graph colors, a corresponding color plane is generated that represents rasterized color values for pixels in regions of the multicolored planar graph assigned to a particular graph color. The color planes and SDFs are then used by a GPU as textures to render an approximation of the multicolored vector content. Thus, the prior technique requires 8 or 10 separate textures (4 or 5 color planes and corresponding SDFs) to represent a particular piece of vector content. However, generating and processing these textures consumes a significant amount of computational resources and draw time. As such, there is a need for improved techniques for rendering multicolored vector content.

Accordingly, embodiments of the present invention are directed to rendering multicolored vector content. In an example embodiment, multicolored vector content is represented by three scalar fields: an unsigned distance field (UDF), a field of region IDs, and a color plane (also called a color field or a color texture). These three fields are pre-computed prior to rendering (e.g., outside of a rendering loop), and then subsequently used (e.g., by a GPU as textures) to render an approximation of the multicolored vector content.

More specifically, in an example embodiment, one or more representations of the three scalar fields are initially generated, whether on a CPU or GPU. In an example implementation, each scalar field is generated as an image or texture where each pixel or texel stores or otherwise identifies a type of value that depends on the field. For example, in some embodiments, the color field represents color values defined by the vector content, and any rasterization algorithm is applied to convert the vector content into a raster image (e.g., a grid of color values), so each pixel or texel stores a color value. However, the "color" field does not have to represent color and can additionally or alternatively represent arbitrary data, coordinates of some other field to be sampled at a later time (e.g., using deferred shading or rendering), and/or other data. The unsigned distance field represents the absolute distance from any point to the nearest boundary (e.g., curve) between regions defined by the vector content. When represented as an image or texture, each pixel or texel stores or otherwise identifies the absolute value of the distance between the pixel or texel and the nearest boundary.

The region ID field identifies which region a particular point is in. When represented as an image or texture, each pixel or texel stores a value that identifies what region the pixel or texel is in (e.g., a region ID). In some embodiments, the region IDs are simply a numbering of the distinct, enclosed regions represented by the vector content. In other embodiments, region IDs are reused for non-adjacent regions, and the number of region IDs is limited to some number (e.g., less than or equal to 16) and assigned using a graph coloring algorithm, and such as Kempe coloring. Note that in some embodiments, enclosed regions do not necessarily correspond to areas defined in the vector content with a single color. For example, a region can be defined as an enclosed area with the same paint or fill type (e.g., a gradient applied to a particular region). In this example, a simple shape with a gradient fill, or an image fill, would still constitute one "region" despite corresponding values in the color field having non-uniform values.

After generating the color field, unsigned distance field, and region ID field (in any order), the different fields are made available to assist with rendering the vector content. In some embodiments, the fields are stored in one or more files or data structures (e.g., three files). Although the different fields are described as separate fields, in some implementations, some or all of the fields are combined, packaged, or otherwise associated. In an example implementation, the unsigned distance field and region ID fields are combined into a single file or data structure (e.g., a texture where each pixel or texel stores unsigned distance and is tagged with a region ID). In another example implementation, all three fields are stored as in one file. These are just a few examples, and other implementations are possible.

Having pre-computed the scalar fields, in some embodiments, the fields are provided to a GPU and used as textures (e.g., color texture, unsigned distance field texture, and region ID texture) for rendering an approximation of the vector content. Typically, GPUs are used to interpolate color values during rendering. By contrast, some embodiments use a GPU (or some other processor) to interpolate signed distance values in lieu of color values. In an example embodiment, sampling code (e.g., a shader program) that returns a color value based on the textures is loaded onto a GPU. When the GPU is provided with vector content in the form of associated textures and given an instruction to draw to screen, the GPU's fragment shader (also called pixel shader) identifies which pixels to ask the sampling code for corresponding color values and invokes the sampling code to determine a color value for any given pixel. To determine a color value for a given output pixel, the sampling code computes an interpolated signed distance value for each corresponding pixel (or texel) in a local neighborhood by sampling from the unsigned distance field texture and the region ID texture, effectively computing a different interpolated signed distance value from the perspective of the reference region of each pixel (or texel) in the neighborhood. Then, the sampling code identifies the pixel (or texel) with the largest interpolated signed distance value (which represents the pixel/texel in the neighborhood that is "most inside" its region), samples the color value of the corresponding texel from the color texture, and returns that color value. In some embodiments, to accommodate a gradient fill in the vector content, instead of simply sampling the color value of the winning texel from the color texture, color values from all the pixels (or texels) from the local neighborhood that are in the same region are identified (e.g., using the region ID texture) and interpolated (e.g., using bilinear interpolation), and the sampling code returns the interpolated color value.

As such, the GPU generates a bitmap using the sampling code to identify color values and outputs the resulting bitmap to a display. Accordingly, the GPU uses pre-computed textures to render an approximation of vector content that maintains sharp, curved edges between regions even when scaled up, and with boundaries between regions do not alias, as with a simple nearest neighbor scaling, or blur, as with bilinear sampling.

Using techniques described herein results in various improvements over prior techniques. For example, by pre-computing color, unsigned distance field, and region ID fields, the subsequent rendering process is substantially simplified, which speeds up performance and reduces compute costs during 2D or 3D rendering. For example, although the time spent pre-computing the fields scales with the complexity of the vector content, once the fields are computed, the cost of rendering and re-rendering vector graphics (e.g., scaling, rotating, perspective projecting, etc.) on a GPU only scales with the number of fragments shaded by the GPU, not with vector content input complexity. Assume a GPU is running a high speed rendering loop (e.g., at 60 fps). Pre-computing these fields (or textures) serve to remove computations that would otherwise need to occur during each pass of the rendering loop. As a result, rendering scalable vector content become faster and cheaper, which itself enables applications or frameworks that cannot accommodate or do not want a complex 2D renderer, want to use 2D content in a 3D context without resorting to more complex representations like non-uniform rational basis spline (NURBS), and/or need more predictable performance when, for example, real time animation with a 60 fps target is required.

As such, using implementations described herein, multi-colored vector content can be rendered in a way that maintains sharp, curved edges between regions even when scaled up, with reduced cost in generating input fields (or textures), less draw time due to reduced (texture) sampling demands, and less overall complexity.

Furthermore, some embodiments are directed to scaling raster content. For example, take a scenario where an application provides infinite zooming. Usually, while zooming into an image, the application outputs some blurry approximation until the zoom operation is released, at which time the application redraws the image at the specified scale. In another example, if a zoom operation quickly scrolls through a few different scales (e.g., updating at 50 or 60 fps), it might be too expensive or even impossible to draw each of the states during the zoom operation. Accordingly, in some embodiments, input raster content is represented by three scalar fields: an unsigned distance field (UDF), an adjacency field, and a color plane (also called a color field or a color texture). These three fields are pre-computed prior to scaling (e.g., outside of a rendering loop), and then subsequently used (e.g., by a GPU as textures) to render a scaled version of the input raster content. In some implementations that scale raster content this way (e.g., while zooming in), the scaled raster content provides a fast, improved approximation until some other, slower algorithm that renders a higher quality image has time to catch up, at which point, the scaled raster content is replaced with the higher quality image.

By way of comparison, in some embodiments, the pre-computed scalar fields generated by the vector content rendering technique described herein can be considered analogous to the pre-computed scalar fields generated by the raster content scaling technique described herein, although the fields are generated in different ways. In some implementations, once computed, the corresponding color fields and unsigned distance fields have similar dimensionalities for the raster content scaling technique and the vector content rendering technique, but the raster content scaling technique replaces the region ID field from the vector scenario with an adjacency field (e.g., an 8-bit binary map).

More specifically, in an example embodiment of the raster content scaling technique, edge detection is applied to an initial raster image (e.g., a rasterized version of vector content) to detect edges (e.g., polylines), and one or more representations of the three scalar fields are generated using the detected edges, whether on a CPU or GPU. For example, in some embodiments, the unsigned distance field represents the absolute distance from any point to the nearest detected edge (polyline). When represented as an image or texture, each pixel or texel stores or otherwise identifies the absolute value of the distance between the pixel or texel and the nearest detected edge.

The adjacency field represents whether each pixel or texel is in the same region as its neighboring pixels or texels. Assume each interior pixel or texel has eight adjacent pixels or texels, each edge pixel or texel has five, and each corner pixel or texel has three. For each adjacent pixel or texel, a line is drawn from the center of a reference pixel or texel to the center of an adjacent pixel or texel, and the number of times that line crosses one of the detected edges (e.g., polyline) is counted. If the number of line crossings is even or zero, the pixels or texels are assumed to be in the same region. If the number of line crossings is odd, the pixels or texels are assumed to be in different regions. This process is repeated and used to populate an 8-bit field, where each pixel or texel stores 8 binary values, one for each possible adjacent pixel or texel. As such, for any particular pixel or texel of the adjacency field, each bit represents whether that pixel or texel is considered to be in the same region as a corresponding adjacent pixel or texel. In some cases, this type of adjacency representation does not guarantee self-consistency. For example, a pixel or texel A may indicate via one of its 8 binary values that neighboring pixel or texel B is in the same region as itself. However, it is possible that pixel or texel B does not indicate via its own binary values that texel A is in the same region. In some embodiments, self-inconsistent adjacency fields are tolerated.

In some embodiments, the color field represents particular color values sampled from the input raster image. Some implementations seeks to exclude blended colors or colors from blurred regions of the input raster image. For example, a raster image may include a red region, a blue region, and purple colors along the edge between those regions. Thus, some implementations seek to factor out blurring effects by excluding from the color field the purple colors along that edge. In some embodiments, this is accomplished by performing a weighted median to choose which pixel or texel in a neighborhood to sample from. For a given reference pixel or texel, each of the pixels or texels in a neighborhood are assigned a weight comprising a sign and a magnitude. In some embodiments, the sign is determined based on whether the particular pixel or texel question and the reference pixel are the same region (e.g., using the adjacency field), and the magnitude is determined based on the unsigned distance to the nearest detected edge (e.g., from the unsigned distance field), distance between the particular pixel or texel and the reference pixel or texel, difference in color values, difference in intensities, and/or other factors. As such, weights are computed for each pixel or texel in the neighborhood of the reference pixel or texel, and a weighted median (or some other metric) is used to select a pixel or texel from the neighborhood, and its color value is sampled from the initial raster image. In some embodiments, the color value sampled from the neighborhood using a weighted median is blended with the original color value of the reference pixel or texel, for example, according to the magnitude of the image gradient (e.g., vector pointing to the largest intensity increase) at the reference or sampled pixel or texel, unsigned distance between the reference pixel or texel and the nearest polyline, and/or other factors. Although some embodiments are described as using a color field, the "color" field does not have to represent color and can additionally or alternatively represent arbitrary data, coordinates of some other field to be sampled at a later time (e.g., using deferred shading or rendering), and/or other data.

Having pre-computed the scalar fields, in some embodiments, the fields are provided to a GPU and used as textures (e.g., color texture, unsigned distance field texture, and adjacency texture) for rendering a scaled version of the initial raster image. In some embodiments, the rendering processes for the vector content rendering and raster content scaling techniques are implemented analogously, but with differences that account for the different dimensionalities of the region ID field (vector content rendering) and the adjacency field (raster content scaling). For example, when synthesizing a partial signed distance field, instead of determining whether pixels or texels are in the same region by looking up and comparing region IDs from the region ID field to determine whether to assign a positive or negative distance value as in the in the vector content rendering technique, in some implementations of the raster content scaling technique, the sign is determined by looking up an appropriate bit from the adjacency field. As such, the GPU generates a bitmap using sampling code to identify color values and outputs the resulting bitmap to a display. Accordingly, the GPU uses pre-computed textures to render a scaled version of raster content that maintains sharp, curved edges between regions.

Example Multicolored Vector Content Rendering Environment

Referring now to FIG. 1, a block diagram of example environment 100 suitable for use in implementing embodiments of the invention is shown. Generally, environment 100 is suitable for and facilitates rendering multicolored vector content. At a high level, environment 100 includes server 105, network 140, and client device 150.

Depending on the implementation, client device 150 and/or server 105 are any kind of computing device capable of rendering and/or facilitating rendering of multicolored vector content. For example, in an embodiment, server 105 and/or client device 150 are each a computing device such as computing device 1500 of FIG. 15. In some embodiments, server 105 and/or client device 150 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, server 105 comprises one or more data stores (or computer data memory) such as data store 120. Although depicted as a single data store residing on or accessible to server 105, in some embodiments, data store 120 is implemented using one or more data stores (e.g., a distributed storage network), implemented on or connected to some other device such as client device 150, implemented using cloud storage, baked to disk, and/or the like. Similarly, in some embodiments, client device 150 comprises one or more corresponding data stores, is implemented using cloud storage, baked to disk, and/or the like.

In the example illustrated in FIG. 1, the components of environment 100 communicate with each other via a network 140. In some non-limiting example implementations, network 140 includes one or more local area networks (LANs) and/or wide area networks (WANs). Such networking environments are commonplace in offices, enterprise-wide computer networks, intranets, and the Internet.

FIG. 1 illustrates an example implementation in which server 105 (e.g., texture computation component 110) pre-computes scalar fields (e.g., unsigned distance field 122, region ID field 124, and/or color field 126) from vector content 121, prior to client device 150 rendering vector content 121 using color sampling tool 180 to generate one or more color values using the pre-computed scalar fields. In this example implementation, the scalar fields are generated and hosted on server 105 along with vector content 121, and made available to client device 150 via network 140. In this implementation, client device 150 includes application or framework 155, which instructs GPU 160 (e.g., via a CPU and/or GPU interface 162) to render vector content 121, and GPU 160 renders an image using color sampling tool 180 to generate color values.

In this example implementation, server 105 includes texture computation component 110, and client device 150 includes color sampling tool 180. In some embodiments, texture computation component 110, color sampling tool 180, and/or any of the elements illustrated in FIG. 1 are incorporated into, integrated into, or otherwise associated with an application(s) or framework(s), or an add-on(s) or plug-in(s) to an application(s) or framework(s), such as application or framework 155. In some embodiments, the application(s) or framework(s) is a stand-alone application, a mobile application, a web application, or the like. For example, in some implementations, the application(s) comprises a web application that runs in a web browser and/or is hosted at least partially server-side. In some cases, the application or framework (or a portion thereof) is integrated into an operating system (e.g., as a service). In an example implementation, application or framework 155 is ADOBE ILLUSTRATOR®, which is a vector graphics editor and design program. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In an example implementation of FIG. 1, texture computation component 110, application or framework 155, GPU 160, and/or color sampling tool 180 coordinate (e.g., via network 140 and/or GPU interface 162) to execute the functionality described herein. In another example, texture computation component 110 and color sampling tool 180 (or some portion thereof) are integrated into a common application executable on a single device (e.g., using a CPU and/or a GPU). In yet another example, texture computation component 110 and color sampling tool 180 (or some portion thereof) are distributed across some other number and/or type(s) of devices. In some embodiments, one application or framework is used to generate scalar fields (or textures) and another application or framework is used to render using the fields (textures). Furthermore, although color sampling tool 180 is illustrated as executing on GPU 160, this need not be the case. Depending on the embodiment, texture computation component 110 and/or color sampling tool 180 are executable on one or more CPUs, one or more GPUs, and/or some combination thereof. These are just examples, and any suitable allocation of functionality among these or other devices is possible within the scope of the present disclosure.

In an example implementation of FIG. 1, application or framework 155 is used to generate, design, view, preview, or otherwise access multicolor vector content that represents an image. In FIG. 1, vector content 121 is illustrated as being stored on server 105, but in some embodiments it is additionally or alternatively stored on client device 150 (and/or some other device). In some cases, vector content 121 is serialized in a file (e.g., a text or binary file that represents an image), but this need not be the case. In an example embodiment, vector content 121 is drafted and/or designed in some editor interface of application or framework 155, which feeds a representation of vector content 121 to other components (e.g., texture computation component 110 and/or GPU 160). In some embodiments, generation of vector content 121 is associated with generation of corresponding scalar fields such that application or framework 155 instructs texture computation component 110 to generate and/or update corresponding scalar fields, for example, periodically while vector content 121 is being designed, upon receiving a save command, prior to closing application or framework 155, and/or at any suitable time.

Texture computation component 110 generates scalar fields (e.g., unsigned distance field 122, region ID field 124, and/or color field 126) from vector content 121. The word texture is often used as the GPU term for an image or bitmap. While images usually carry colors (e.g., a field of color values), textures often additionally or alternatively include other types of data, typically scalar data. More generally, an image or texture with pixels or texels that store scalar values (e.g., representing color, distance, ID, etc.) can be understood as a scalar field. Thus, although texture computation component 110 is sometimes described as generating textures or scalar fields, texture computation component 110 can be understood as generating images, textures, scalar fields, and/or any representation thereof. In an example implementation, texture computation component 110 includes unsigned distance computation component 112 (which generates unsigned distance field 122), region ID assignment component 114 (which generates region ID field 124), and color field generator 116 (which generates color field 126).

In some embodiments, unsigned distance computation component 112 generates unsigned distance field 122 from vector content 121. Generally, vector content 121 represents an image (e.g., shapes and other geometric primitives) using mathematical descriptions, and unsigned distance computation component 112 uses the mathematical descriptions to compute a distance from any sampled point (e.g., each pixel or texel) to the closest boundary between regions defined by vector content 121. Various embodiments use any known technique to compute absolute distance values from vector content 121 using any coordinate system. As such, unsigned distance computation component 112 generates and stores a representation of a field of unsigned distance values (unsigned distance field 122). In an example implementation, each pixel (or texel) represents unsigned distance using 8 bits.

Region ID assignment component 114 identifies which region a particular sampled point is in, and assigns a value that identifies the region (e.g., a region ID). In an example implementation, region ID assignment component 114 performs a connected components analysis of vector content 121 (or some derived structure thereof) to identify enclosed regions, and assigns region IDs to the different regions. Generally, any suitable numbering or identification scheme is possible. In an example embodiment, the region IDs are simply a numbering of the distinct regions. In another embodiment, region IDs are reused for non-adjacent regions, and the number of region IDs is limited to some number (e.g., less than or equal to 16) and assigned using a graph coloring algorithm, such as Kempe coloring. As such, region ID assignment component 114 constructs a field of region IDs (e.g., region ID field 124) by identifying and storing, for each sampled point (e.g., each pixel or texel), the region ID of the enclosed region the sampled point is in. In an example implementation, each pixel (or texel) represents a region ID using 4 bits.

Color field generator 116 performs any known rasterization algorithm to generate color field 126 (also called a color plane or a color texture) that represents the color values represented by vector content 121. Generally, any rasterization algorithm is applied to convert vector content 121 into a raster image (e.g., a grid of color values), so each pixel or texel stores a color value defined by vector content 121. However, "color" field 126 does not have to represent color and can additionally or alternatively represent arbitrary data, coordinates of some other field to be sampled at a later time (e.g., using deferred shading or rendering), and/or other data.

Figure 2:
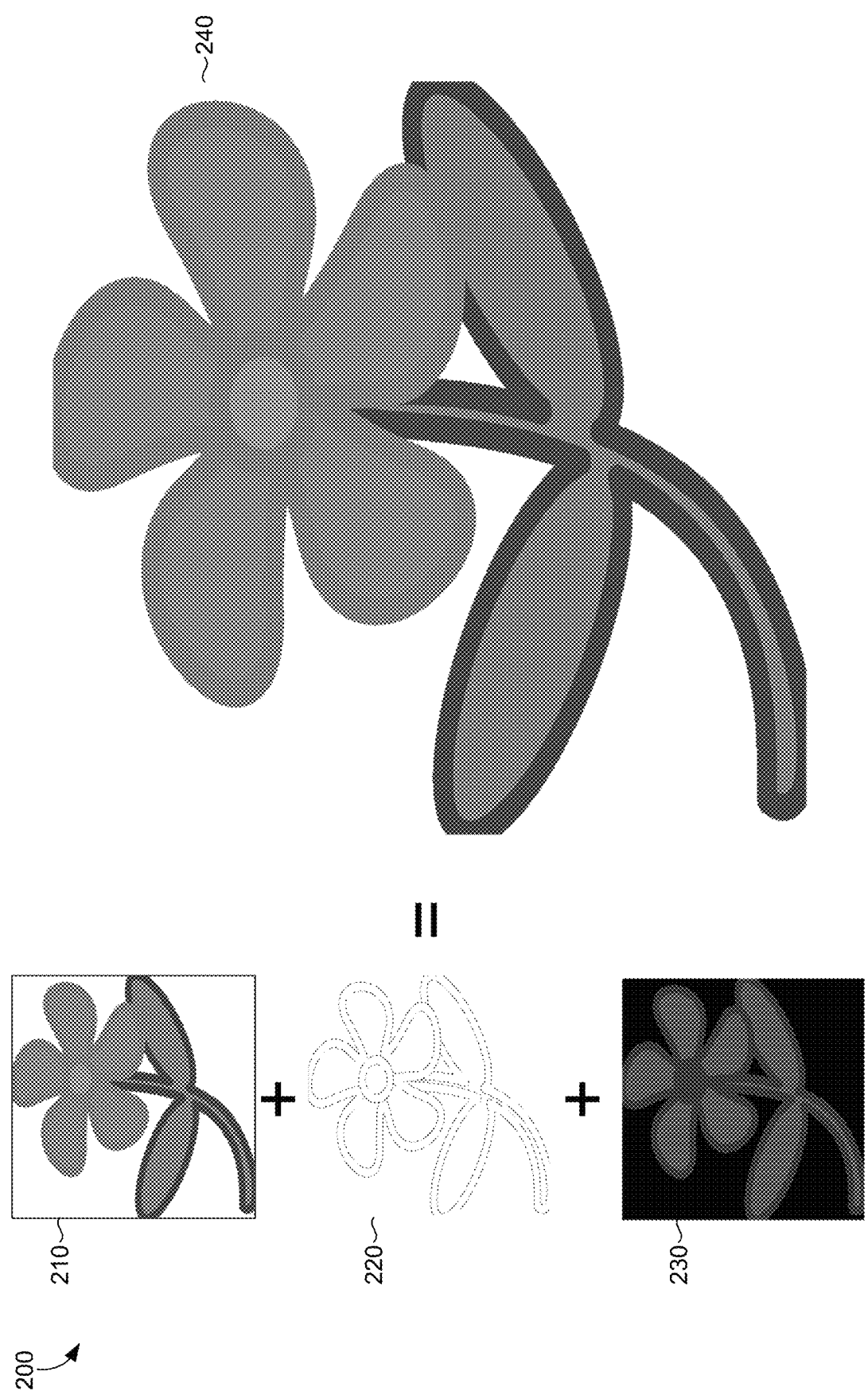
FIG. 2 illustrates example scalar fields that can be used to represent and scale vector content, in accordance with various embodiments.

FIG. 2 illustrates example scalar fields that can be used to represent and scale vector content, in accordance with various embodiments. Assume vector content defines an image of a flower. In this example, the vector content is represented by color field 210, unsigned distance field 220, and region ID field 230. For illustration purposes, each of color field 210, unsigned distance field 220, region ID field 230 has been converted to .PNG format. Color field 210 represents color values defined by the underlying vector content. Unsigned distance field 220 represents the absolute distance from any point to the nearest boundary defined by the vector content, and has been companded for illustration purposes (e.g., so black illustrates a distance of zero, white illustrates a distance of greater than or equal to one, and gradations of gray illustrate distances between zero and one). Region ID field 230 identifies which region a particular point is in and has been color coded (and converted to greyscale) to identify different regions defined by the underlying vector content. Image 240 is a representation of what a rendering based on color field 210, unsigned distance field 220, and region ID field 230 would look like.

As such, and returning to FIG. 1, texture computation component 110 generates and stores some representation of unsigned distance field 122, region ID field 124, and/or color field 126. Generally, an image, texture, scalar field, and/or some representation thereof can include, store, identify, or otherwise support multiple elements (e.g., channels, tags, etc.) for each pixel or texel. As a result, depending on the implementation, texture computation component 110 generates, stores, identifies, and/or otherwise represents any number of images, textures, and/or scalar fields using any number of data structures and/or files. For example, in some embodiments, unsigned distance field 122, region ID field 124, and/or color field 126 are stored in one or more files or data structures, hosted on server 105, baked to disk, and/or otherwise associated with vector content 121. Generally, texture computation component 110 (or some portion thereof) is executed on one or more CPUs, one or more GPUs, or some combination thereof.

In some embodiments, vector content 121 and its associated unsigned distance field 122, region ID field 124, and/or color field 126 are made available to an application or framework (e.g., application or framework 155 of client device 150) for rendering. The application or framework need not be the same one used to generate unsigned distance field 122, region ID field 124, and/or color field 126. Similarly, a computing device used for rendering need not be the same one used to generate unsigned distance field 122, region ID field 124, and/or color field 126. In a simple example, Adobe Illustrator artwork created by one user on one device is subsequently rendered using the same application and device. In another example, the artwork is distributed for rendering by another Adobe Illustrator user on another device. In yet another example, artwork created using one application is rendered (e.g., previewed, opened, repetitively generated in an animation loop) using another application. These are just a few examples, and other implementations are possible within the scope of the present disclosure.

The implementation illustrated in FIG. 1 includes application or framework 155 and GPU 160. In an example embodiment, application or framework 155 is used to access vector content 121, and application or framework 155 receives a command (e.g., via a user interface) or other indication that vector content 121 should be rendered. In this example, application or framework 155 is configured to cause GPU 160 to render vector content 121 using its associated scalar fields (e.g., unsigned distance field 122, region ID field 124, and/or color field 126). For example, upon receiving a command or instruction to render vector content 121, application or framework 155 and/or client device 150 sends or otherwise identifies vector content 121 and its associated scalar fields to GPU 160 for rendering with color sampling tool 180.

At a high level, GPU 160 executes any known graphics rendering pipeline to render images and/or video, and the graphics rendering pipeline outputs a raster image that approximates vector content 121. Modern GPUs typically allow programmers to customize or configure a graphics rendering pipeline using shader programs—program instructions that are written in a shader language and are executable by the GPU in the graphics rendering pipeline. At a high level, an example graphics rendering pipeline starts with a data setup stage (usually executed by a CPU), after which a GPU (e.g., a vertex shader) processes vertices of vector content, generates fragments from the processed vertices, and (e.g., a fragment shader) processes each fragment to identify colors for pixels in the fragment. Various embodiments use any known vertex processing and rasterization technique to generate fragments from vector content 121 (e.g., its associated scalar fields), use any known technique to identify pixels corresponding to each fragment, and use color sampling tool 180 to identify a color value for each sampled pixel. Before describing color sampling tool 180 in more detail, the example GPU and GPU interface 162 illustrated in FIG. 1 is described.

In embodiments like the one illustrated in FIG. 1 where one or more GPUs are used for rendering, any suitable GPU or GPU architecture is possible. GPUs typically include specialized components configured to optimize rendering speed, render three-dimensional models, apply textures to surfaces, and/or the like. Furthermore, GPUs typically include one or more software interfaces, such as application program interfaces (APIs) that allow programmers to invoke functionality of the GPU, interfaces between native and custom code, and/or the like. For the sake of brevity, GPU 160 is illustrated with a limited selection of components. Although some embodiments are described with rendering being performed on a GPU, this need not be the case. Generally, various implementations execute any known graphics rendering pipeline (e.g., vertex processing, rasterization, color sampling) on one or more CPUs, one or more GPUs, and/or some combination thereof.

In FIG. 1, GPU 160 includes GPU interface 162, GPU memory 164 with GPU program code 170, buffer(s) 190, and display interface 192. Generally, GPU interface 162 provides a communication channel between GPU 160 and some data source (e.g., a communications bus, CPU, application, and/or framework of a host computer system, such as client device 150). As such, GPU 160 receives various items via GPU interface 162 from the data source, such as executable program code (e.g., a shader program, such as color sampling tool 180), vector content 121, its associated unsigned distance field 122, region ID field 124, and/or color field 126, and/or other items.

In some embodiments, GPU 160 includes GPU memory 164 with random-access memory (RAM) that is accessible to the components of GPU 160. GPU memory 164 is used to store various types of data and instructions such as input data (e.g., vector content 121, associated unsigned distance field 122, region ID field 124, color field 126), output data, intermediate data, program instructions for performing various tasks, etc. Although GPU memory 164 is illustrated as part of GPU 160, this need not be case. For example, in some implementations, GPU 160 is configured to access memory (e.g., a portion of RAM of client device 150) via GPU interface 162, instead of or in addition to having dedicated graphics memory. In FIG. 1, GPU 160 includes GPU program code 170 (e.g., native, programmable, custom, etc.) that is executable by GPU 160 to perform various functions of a graphics rendering pipeline. Depending on the embodiment, elements of GPU program code 170 are native, and/or elements of GPU program code 170 are programmable.

Generally, GPU 160 executes GPU program code 170 embodying a graphics rendering pipeline that renders vector content 121 into an approximated raster image. For brevity, only certain elements of an example graphics rendering pipeline are illustrated in FIG. 1, namely, vertex shader 172, fragment shader 176, and color sampling tool 180. In executing an example graphics rendering pipeline, GPU 160 invokes vertex shader 172 and/or fragment shader 176 at various points in the pipeline. For example, vertex shader 172 comprises programmable instructions that are executable by GPU 160 to determine properties (e.g., position) of a particular vertex, for example, using any known vertex processing technique. Accordingly, in some embodiments, GPU 160 invokes vertex shader 172 for each vertex represented by vector content 121 to determine properties of each vertex.

Continuing with an example graphics rendering pipeline, GPU 160 processes the vertices into fragments using any known technique, and fragment shader 176 (also known as a pixel shader) processes each fragment into corresponding pixels and color values. For example, fragment shader 176 comprises programmable instructions that are executable by GPU 160 to identify pixels corresponding to each fragment, and determine a color value for a particular pixel by invoking color sampling tool 180. Accordingly, in some embodiments, GPU 160 invokes fragment shader 176 to identify pixels corresponding to each identified fragment using any known technique, and for each identified pixel, GPU 160 and/or fragment shader 176 invokes color sampling tool 180 to identify a corresponding value.

Color sampling tool 180 identifies a color value for a particular pixel using pre-generated scalar fields (e.g., unsigned distance field 122, region ID field 124, and/or color field 126) that represent vector content 121. In some embodiments, color sampling tool 180 comprises instructions that are written in a shader language (e.g., OpenGL Shading Language), loaded on to GPU 160 (e.g., via GPU interface 162), and executable by GPU 160. In an example embodiment, color sampling tool 180 identifies a color value for a given pixel by generating an interpolated signed distance value for each pixel in a local neighborhood of the given pixel using unsigned distance field 122 and region ID field 124, selecting the maximum, and sampling from a corresponding texel of color field 126. In the embodiment illustrated in FIG. 1, color sampling tool 180 includes partial signed distance field synthesizer 182, signed distance interpolator 184, and sample selector 186.

Typically, GPUs are used to interpolate color values from texels in a local neighborhood. By contrast, the present techniques use GPU 160 to interpolate signed distance values from unsigned distance field 122 using signs generated using region ID field 124. Take bilinear interpolation and a neighborhood of 4 texels as an example. In this example, partial signed distance field synthesizer 182 synthesizes a partial signed distance field with respect to each of the 4 texels being interpolated, using unsigned distance field 122 and region ID field 124. Each partial signed distance field comprises a value for each texel generated by pairing the unsigned distance value for that texel from unsigned distance field 122 with a positive or negative sign depending on whether that texel is inside (e.g., positive) or outside (e.g., negative) a reference region (e.g., the region of the texel for which the partial field is being generated).

Figure 3A:
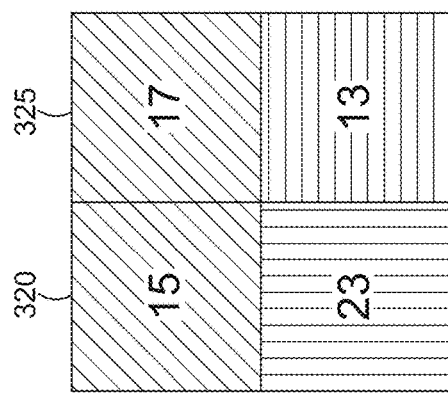
FIGS. 3A-3E are illustrations of example boundaries between regions and corresponding partial distance fields, in accordance with various embodiments.
Figure 3B:
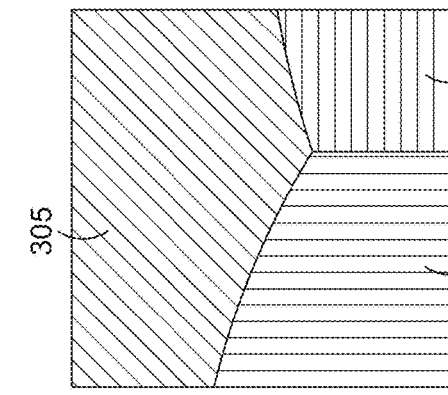

By way of illustration, FIGS. 3A-3E depict example boundaries between regions and corresponding partial distance fields, in accordance with various embodiments. More specifically, FIG. 3A depicts example boundaries defined by vector content (e.g., vector content 121 of FIG. 1) and corresponding regions 305, 310, and 315. FIG. 3B depicts an example unsigned distance field in a 2×2 pixel (or texel) neighborhood corresponding to the area covered by FIG. 3A. More specifically, each pixel (or texel) 320, 325, 330, and 335 in FIG. 3B stores the absolute value of the distance from the pixel (texel) to the closest boundary. Thus, FIG. 3B is an example of a (partial) unsigned distance field.

Figure 3C:
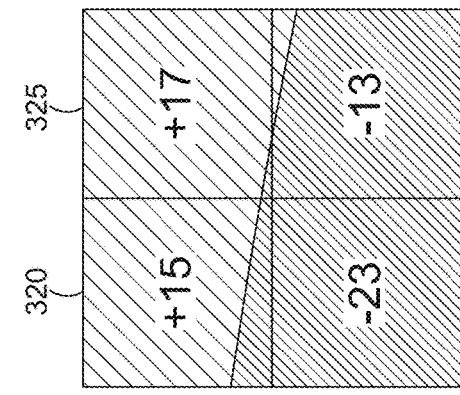

FIG. 3C illustrates a corresponding partial, signed distance field from the perspective of region 305 of FIG. 3A. Here, pixels (texels) 320 and 325 are inside region 305 of FIG. 3A, so those pixels (texels) are assigned a positive distance. By contrast, pixels (texels) 330 and 335 are outside region 305 of FIG. 3A, so those pixels (texels) are assigned a negative distance. The result is a partial, signed distance field from the perspective of pixel (texel) 320 or 325 and their corresponding reference region 305.

Figure 3D:
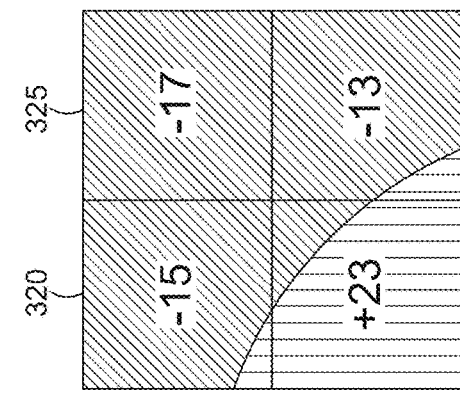

FIG. 3D illustrates a corresponding partial, signed distance field from the perspective of region 310 of FIG. 3A. Here, pixel (texel) 330 is inside region 310 of FIG. 3A, so that pixel (texel) is assigned a positive distance. By contrast, pixels (texels) 320, 325, and 335 are outside region 305 of FIG. 3A, so those pixels (texels) are assigned a negative distance. The result is a partial, signed distance field from the perspective of pixel (texel) 330 and its corresponding reference region 310.

Figure 3E:
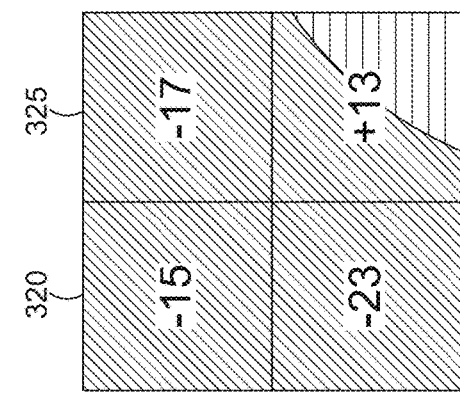

FIG. 3E illustrates a corresponding partial, signed distance field from the perspective of region 315 of FIG. 3A. Here, pixel (texel) 335 is inside region 315 of FIG. 3A, so that pixel (texel) is assigned a positive distance. By contrast, pixels (texels) 320, 325, and 330 are outside region 305 of FIG. 3A, so those pixels (texels) are assigned a negative distance. The result is a partial, signed distance field from the perspective of pixel (texel) 335 and its corresponding reference region 315.

Returning now to partial signed distance field synthesizer 182 of FIG. 1, assume FIG. 3B illustrates a portion of unsigned distance field 122 in a 2×2 neighborhood being interpolated. Partial signed distance field synthesizer 182 synthesizes a partial signed distance field with respect to each of the 4 texels being interpolated—one field for each of texels 320, 325, 330, and 335. For texels 320 and 325, partial signed distance field synthesizer 182 synthesizes a partial signed distance field corresponding to FIG. 3C, from the perspective of region 305 of FIG. 3A. For texel 330, partial signed distance field synthesizer 182 synthesizes a partial signed distance field corresponding to FIG. 3D, from the perspective of region 310 of FIG. 3A. And for texel 335, partial signed distance field synthesizer 182 synthesizes a partial signed distance field corresponding to FIG. 3E, from the perspective of region 315 of FIG. 3A. Note that in some embodiments in which region ID field 124 stores the region ID for each texel, partial signed distance field synthesizer 182 determines whether to assign a positive or negative distance value by looking up and comparing region IDs from region ID field 124.

In some embodiments, signed distance interpolator 184 computes an interpolated signed distance value corresponding to each synthesized partial signed distance field (which also corresponds to each texel in the neighborhood being interpolated). By way of nonlimiting example, signed distance interpolator 184 samples each of the synthesized distance fields using bilinear interpolation, adjusting for fractional coordinates or positions that do not lie on the pixel/texel grid. However, any type of interpolation is possible within the scope of the present disclosure.

Sample selector 186 identifies which of the samples (e.g., the interpolated signed distance values) has the highest value, and samples the color value of the corresponding texel from color field 126. This technique effectively identifies the pixel in the neighborhood that is the "most inside" its region, and samples color there. In some embodiments, in the event of a tie, some arbitrary but consistent choice of winner is made. Thus, sample selector 186 returns the sampled color value to fragment shader 176, which assigns that color value to the pixel being rendered. It is worth reiterating that the "color" field 126 does not have to represent color (e.g., an RGB (A) value). It could represent arbitrary data (or even be represented by more than one concrete texture, such as a texture that represents coordinates of some other texture to be sampled at a later time) for use with any suitable shading technique (e.g., deferred shading or rendering).

In some embodiments, upon determining a color value for a particular pixel, GPU 160 and/or fragment shader 176 store the color value in one or more buffer(s) 190. In an example implementation, GPU memory 164 includes buffer(s) 190 that (e.g., each) store a two-dimensional array of pixel data (e.g., color values) and/or pixel metadata (e.g., depth values, stencil values, etc.). In some embodiments, buffer(s) 190 include one or more image buffers that store intermediate or final pixel values generated during the rendering process.

As such, GPU 160 samples color values for pixels by synthesizing partial signed distances from unsigned distance values and region IDs, and outputs the resulting bitmap to a display. In the embodiment illustrated in FIG. 1, GPU 160 includes display interface 192, which provides output data (e.g., a raster image that approximates vector content 121) to a data target, such as a graphical user interface of application or framework 155, a display device, a printer, and/or some other component. In some embodiments in which the data target includes a display device, GPU 160 drives the display by repetitively providing output data (e.g., an updated raster image from a screen buffer, such as buffer(s) 190) at a designated rate.

Accordingly, the GPU uses pre-computed textures to render an approximation of vector content that maintains sharp, curved edges between regions even when scaled up, and with boundaries between regions do not alias or blur. In embodiments in which GPU 160 is executing a high speed rendering loop (e.g., 60 fps), using pre-computed textures removes those computations from the rendering loop, reducing the cost of rendering.

Figure 4:
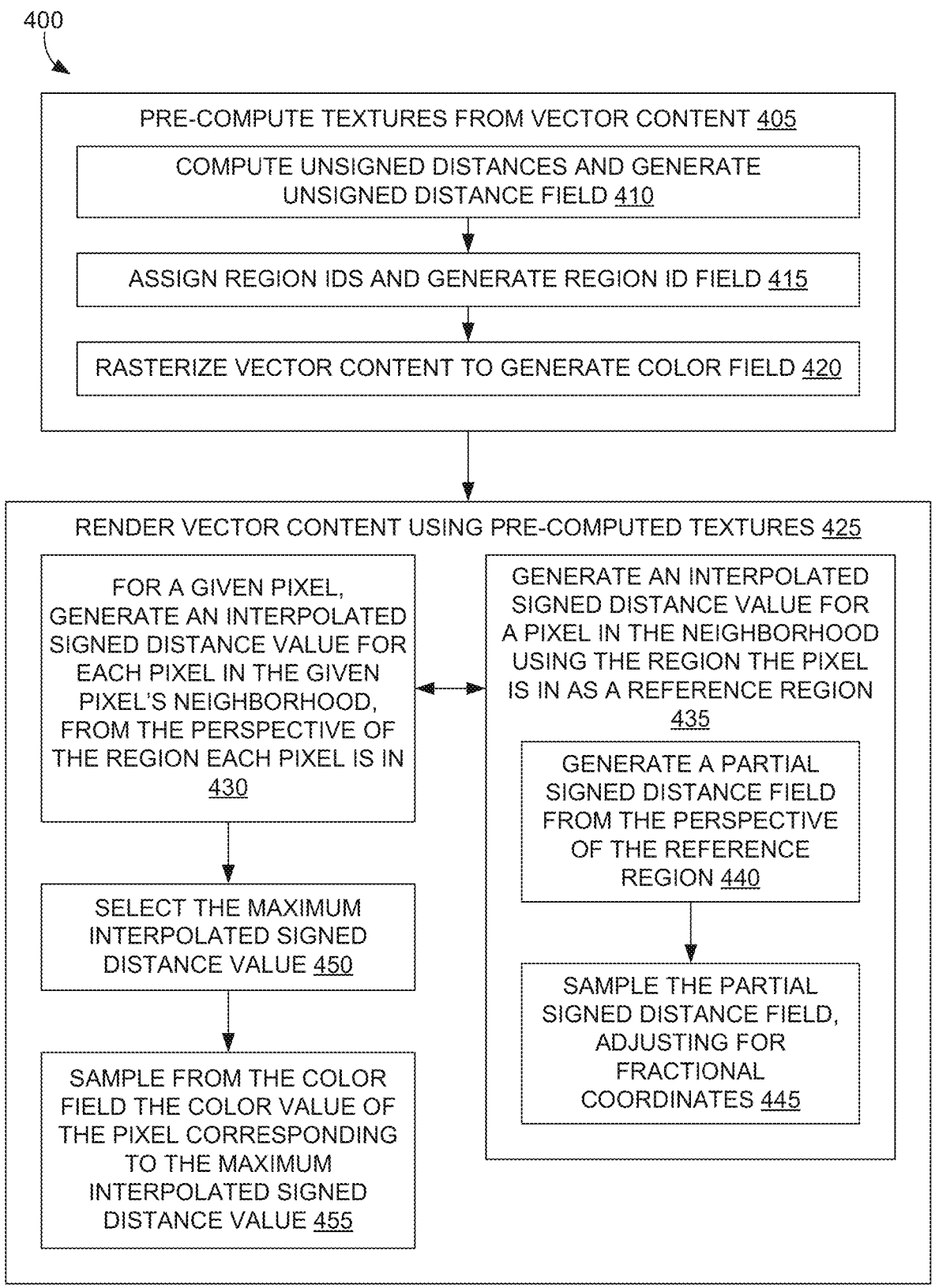
FIG. 4 is a flow diagram showing a method for rendering multicolor vector content using pre-computed textures, in accordance with various embodiments.
Figure 5:
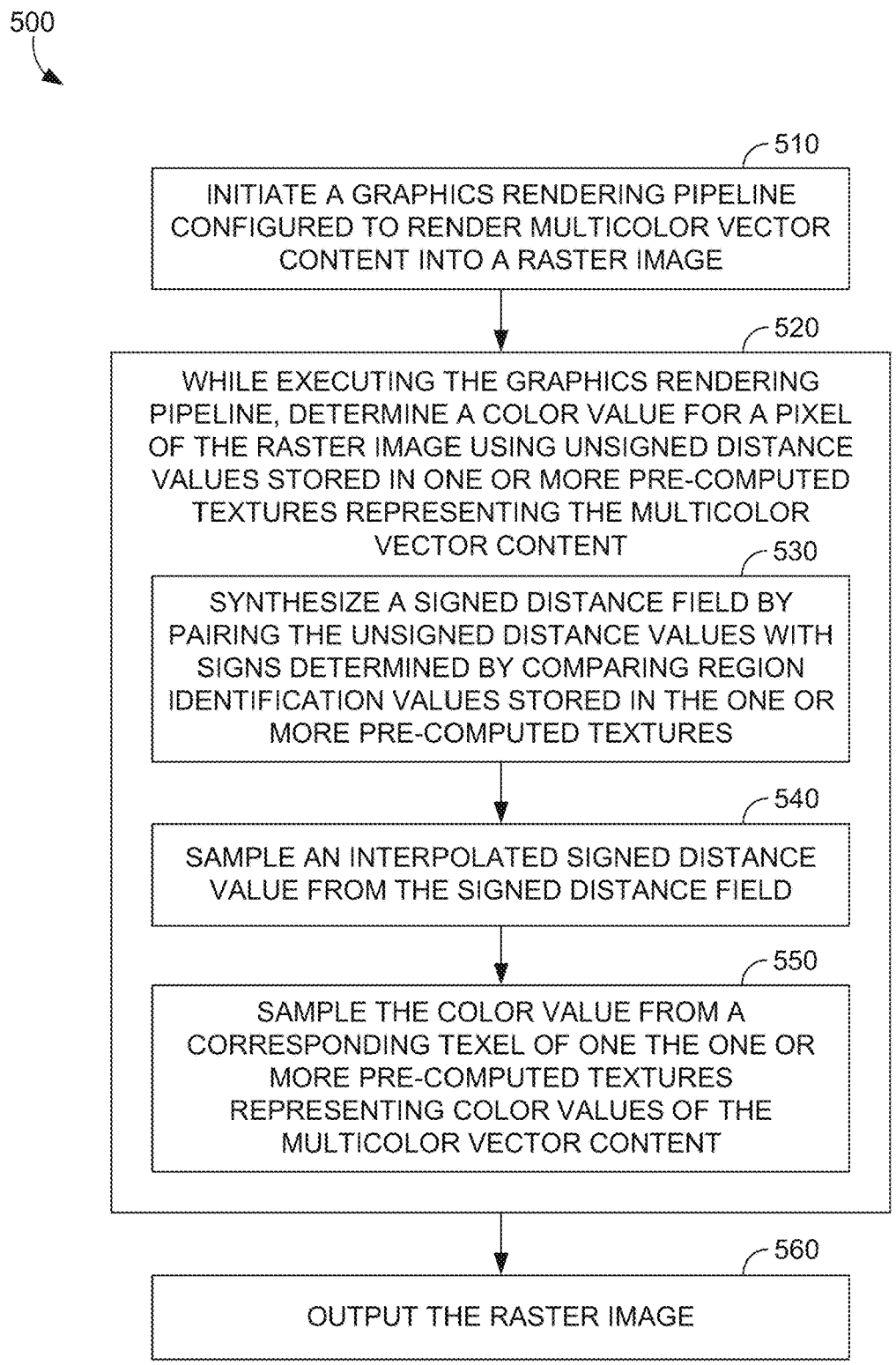
FIG. 5 is a flow diagram showing a method for rendering multicolor vector content using unsigned distance values stored in one or more pre-computed textures, in accordance with various embodiments.
Figure 6:
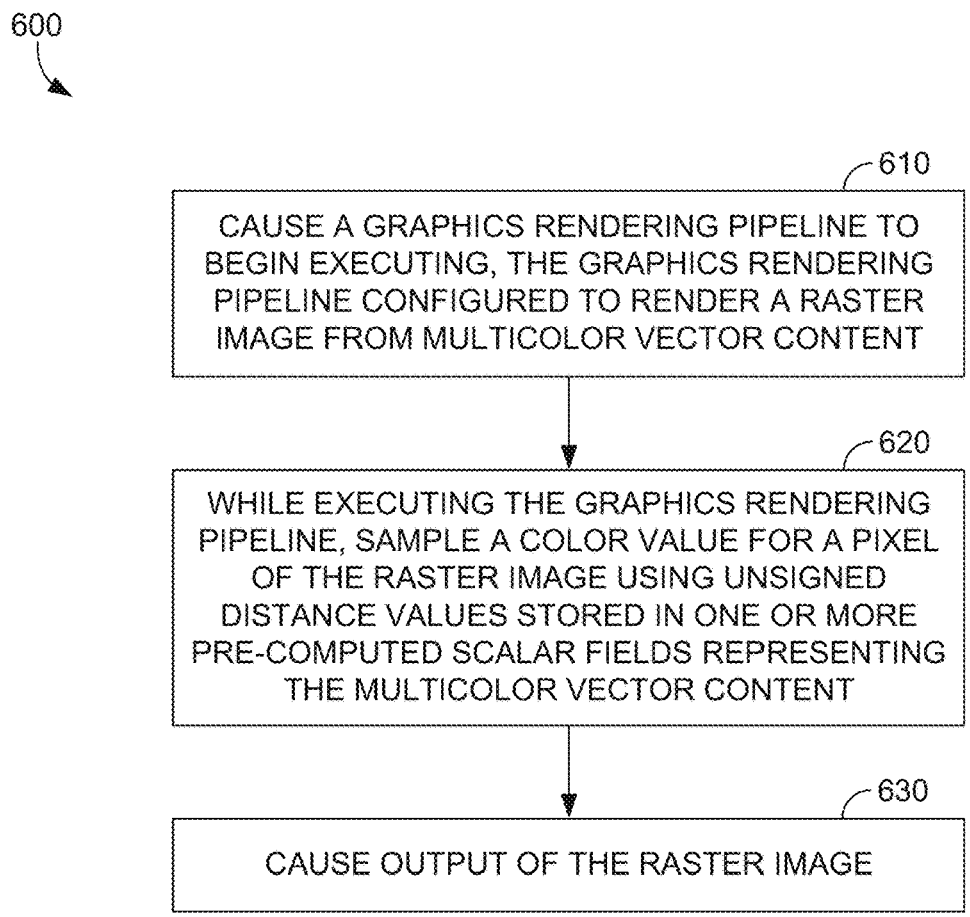
FIG. 6 is a flow diagram showing a method for rendering multicolor vector content using pre-computed scalar fields, in accordance with various embodiments.

With reference now to FIGS. 4-6, flow diagrams are provided illustrating methods for rendering multicolor vector content. Each block of the methods 400, 500, and 600 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 4, FIG. 4 illustrates a method 400 for rendering multicolor vector content using pre-computed textures, in accordance with various embodiments. Initially at block 405, textures are pre-computed from vector content. Although the term texture is used here, it should be understood to include any suitable representation of a scalar field (e.g., image or texture). Here, pre-computation refers to the fact that it occurs prior to rendering in block 425. Blocks 410-420 illustrate a possible way of performing at least a portion of block 405. For example, at block 410, unsigned distances are computed and used to populate an unsigned distance field (e.g., as described above with respect to unsigned distance computation component 112 of FIG. 1). At block 415, region IDs are assigned and used to populate a region ID field (e.g., as described above with respect to region ID assignment component 114 of FIG. 1). At block 420, the vector content is rasterized to generate a color field (e.g., as described above with respect to color field generator 116 FIG. 1).

At block 425, vector content is rendered using the pre-computed textures. Blocks 430-455 illustrate a possible way of performing at least a portion of block 425. In an example embodiment, a CPU and/or a GPU executes a graphics rendering loop, using any known vertex processing and rasterization technique to generate fragments from the vector content (e.g., its associated pre-computed textures), using any known technique to identify pixels corresponding to each fragment, and using blocks 430-455 to identify a color value for each of one or more output pixels. For example, to generate a color value for a given pixel, initially at block 430, an interpolated signed distance value is generated for each pixel (or texel) in the given pixel's neighborhood, from the perspective of the region each pixel (or texel) is in. Note, each interpolated signed distance value could be considered to correspond to a pixel of an output image, a texel of an input texture, and/or a pixel or texel of some synthesized field.

Block 435 illustrates a possible way of performing at least a portion of block 430. For example, assume a neighborhood of 4 pixels (texels) being interpolated for the given pixel in block 430. For each pixel (or texel) in the given pixel's neighborhood, block 435 illustrates a possible way of generating an interpolated signed distance value for that pixel (or texel), using the region the pixel is in as a reference region. More specifically, blocks 440-445 illustrate a possible way to generate an interpolated signed distance value for a particular pixel (or texel) in the neighborhood. At block 440, a partial signed distance field is generated from the perspective of the reference region (e.g., as described above with respect to partial signed distance field synthesizer 182 of FIG. 1). At block 450, the partial signed distance field is sampled (e.g., using bilinear interpolation), adjusting for fractional coordinates (e.g., as described above with respect to signed distance interpolator 184 of FIG. 1). In an embodiment, blocks 440-445 are repeated to generate an interpolated signed distance value for each pixel (or texel) in the neighborhood, from the perspective of the region each pixel (texel) is in. Continuing with the example neighborhood of 4 pixels (texels) being interpolated, this can result in four partial signed distance fields and four interpolated signed distance values.

At block 450, the maximum interpolated signed distance value is selected, and at block 455, the color value of the pixel (or texel) corresponding to the maximum interpolated signed distance value is sampled from the color field. That color value is designated for the output pixel being rendered. Generally, blocks 430-455 are repeated any number of times, each time identifying a color value for a particular output pixel. As such, in some embodiments, a bitmap is output (e.g., to a display) using the identified color values.

Turning now to FIG. 5, FIG. 5 illustrates a method 500 for rendering multicolor vector content using unsigned distance values stored in one or more pre-computed textures, in accordance with various embodiments. Initially at block 510, a graphics rendering pipeline configured to render multicolor vector content into a raster image is initiated. At block 520, while the graphics rendering pipeline is executing, a color value for a pixel of the raster image is determined using unsigned distance values stored in one or more pre-computed textures representing the multicolor vector content. Blocks 530-550 illustrate a possible way of performing at least a portion of block 520. At block 530, a signed distance field is synthesized by pairing the unsigned distance values with signs determined by comparing region identification values stored in the one or more pre-computed textures. At block 540, an interpolated signed distance value is sampled from the signed distance field. At block 550, the color value is sampled from a corresponding texel of the one or more pre-computed textures representing color values of the multicolor vector content. At block 560, the raster image is output.

Turning now to FIG. 6, FIG. 6 illustrates a method 600 for rendering multicolor vector content using pre-computed scalar fields, in accordance with various embodiments. Initially at block 610, a graphics rendering pipeline begins executing. The graphics rendering pipeline configured to render a raster image from multicolor vector content. At block 620, while executing the graphics rendering pipeline, a color value for a pixel of the raster image is sampled using unsigned distance values stored in one or more pre-computed scalar fields representing the multicolor vector content. At block 630, output of the raster image is caused.

Example Raster Content Scaling Environment

Since raster images are typically represented with a grid of pixels that store color values, when a raster image is magnified, individual pixels can become visible and the image can become visually distorted. As a result, simply zooming into a particular raster image typically results in visual distortion. Accordingly, some embodiments are directed to scaling up a particular raster image from a lower quality version to a higher quality version. Generally, scaling techniques described herein are capable of implementation in any number of scenarios and applications, such as a single event scaling operation (e.g., scaling up a digital photo), repetitively scaling in a rendering loop (e.g., scaling rasterized vector content during a zoom operation), and/or otherwise.

Figure 7:
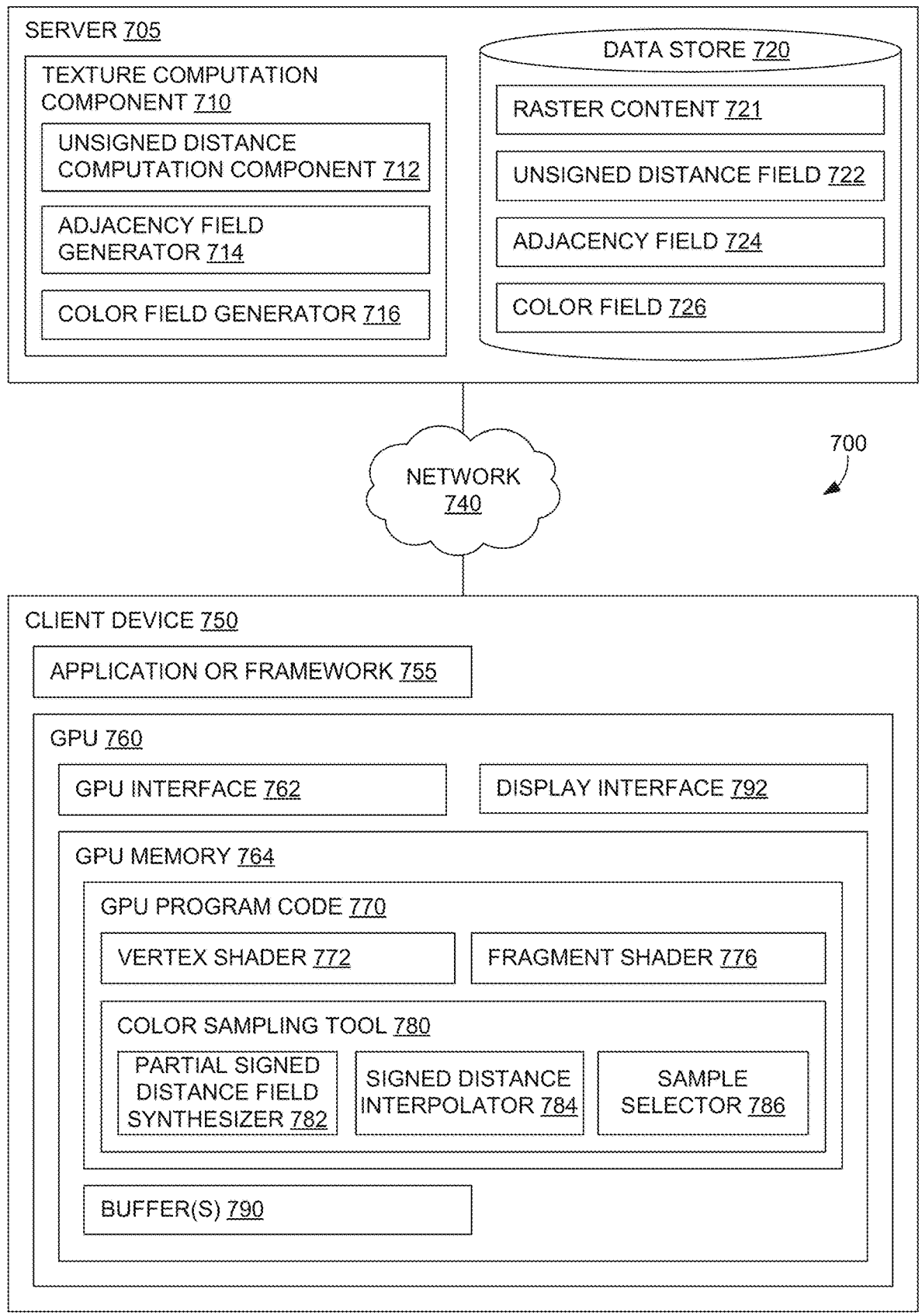
FIG. 7 is a block diagram of an example computing system suitable for scaling raster content, in accordance with various embodiments.

Referring now to FIG. 7, a block diagram of example environment 700 suitable for use in scaling raster content is shown. In some embodiments, the components illustrated in FIG. 7 are implemented similarly as correspondingly named components in FIG. 1, with differences identified below. In the example implementation illustrated in FIG. 7, environment 700 includes server 705, network 740, and client device 750. In this implementation, server 705 (e.g., texture computation component 710) pre-computes scalar fields (e.g., unsigned distance field 722, adjacency field 724, and/or color field 726) from raster content 721, prior to client device 750 scaling raster content 721 using color sampling tool 780 to generate one or more color values using the pre-computed scalar fields. In this example implementation, the scalar fields are generated and hosted on server 705, and made available to client device 750 via network 740. In this implementation, client device 750 includes application or framework 755, which instructs GPU 760 (e.g., via a CPU and/or GPU interface 762) to generate a scaled version of render content 721, and GPU 760 renders a corresponding image using color sampling tool 780 to generate color values.

In this example implementation, server 705 includes texture computation component 710, and client device 750 includes color sampling tool 780. In some embodiments, texture computation component 710, color sampling tool 780, and/or any of the elements illustrated in FIG. 7 are incorporated into, integrated into, or otherwise associated with an application(s) or framework(s), or an add-on(s) or plug-in(s) to an application(s) or framework(s), such as application or framework 755. In some embodiments, the application(s) or framework(s) is a stand-alone application, a mobile application, a web application, or the like. For example, in some implementations, the application(s) comprises a web application that runs in a web browser and/or is hosted at least partially server-side. In some cases, the application or framework (or a portion thereof) is integrated into an operating system (e.g., as a service). In an example implementation, application or framework 755 is Adobe Illustrator. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In an example implementation of FIG. 7, texture computation component 710, application or framework 755, GPU 760, and/or color sampling tool 780 coordinate (e.g., via network 740 and/or GPU interface 762) to execute the functionality described herein. In another example, texture computation component 710 and color sampling tool 780 (or some portion thereof) are integrated into a common application executable on a single device (e.g., using a CPU and/or a GPU). In yet another example, texture computation component 710 and color sampling tool 780 (or some portion thereof) are distributed across some other number and/or type(s) of devices. In some embodiments, one application or framework is used to generate scalar fields (or textures) and another application or framework is used to render using the fields (textures). Furthermore, although color sampling tool 780 is illustrated as executing on GPU 760, this need not be the case. Depending on the embodiment, texture computation component 710 and/or color sampling tool 780 are executable on one or more CPUs, one or more GPUs, and/or some combination thereof. These are just examples, and any suitable allocation of functionality among these or other devices is possible within the scope of the present disclosure.

In an example implementation of FIG. 7, application or framework 755 is used to generate, design, view, preview, or otherwise access raster content 721. In FIG. 7, raster content 721 is illustrated as being stored on server 705, but in some embodiments it is additionally or alternatively stored on client device 750 (and/or some other device). In some cases, raster content 721 includes an image file in a raster format (e.g., JPEG, TIFF, GIF, BMP, or PNG, to name a few non-limiting examples), but this need not be the case. In some cases, raster content 721 is a rasterized version of vector content (e.g., color field 126 of FIG. 1, a raster image rendered from vector content 121). In an example embodiment, raster content 721 is viewed in some interface of application or framework 755, which feeds a representation of raster content 721 to other components (e.g., texture computation component 710 and/or GPU 760). In some embodiments, application or framework 755 instructs texture computation component 710 to generate and/or update corresponding scalar fields, for example, upon selecting or loading raster content 721, periodically while raster content 721 is being designed, periodically during a zoom operation (e.g., zooming into) raster content 721, upon receiving a save command, prior to closing application or framework 755, and/or at any suitable time.

Texture computation component 710 generates textures or scalar fields (e.g., unsigned distance field 722, adjacency field 724, and/or color field 726) from raster content 721. Although texture computation component 710 is sometimes described as generating textures or scalar fields, texture computation component 710 can be understood as generating images, textures, scalar fields, and/or any representation thereof. In an example implementation, texture computation component 710 includes unsigned distance computation component 712 (which generates unsigned distance field 722), adjacency field generator 714 (which generates adjacency field 724), and color field generator 716 (which generates color field 726).

In some embodiments, texture computation component 710 applies any known edge detection technique detect edges (e.g., a list of polylines) in raster content 721, and the detected edges are used to generate the scalar fields. For example, in some embodiments, unsigned distance computation component 712 generates unsigned distance field 722 representing the absolute distance from any point to the nearest detected edge (polyline). When represented as an image or texture, each pixel or texel stores or otherwise identifies the absolute value of the distance between the pixel or texel and the nearest detected edge. In an example implementation, the distance to the nearest polyline is determined by calculating the distance to multiple polylines (e.g. each polyline) using any coordinate system and taking the minimum value, but any suitable implementation is possible.

Adjacency field generator 714 determines whether each pixel or texel is part of the same region as its neighboring pixels or texels using the detected edges (polylines) as boundaries for different regions, and assigns corresponding values to identify pixels that are (e.g., 1) or are not (e.g., 0) in the same region. In an example implementation, each pixel or texel has no more than eight neighboring pixels or texels, so adjacency field 724 is implemented as an 8-bit binary field, where each pixel or texel stores 8 bits, one for each adjacent neighbor. To determine the bit values for a particular reference pixel or texel, adjacency field generator 714 considers each adjacent pixel or texel, draws a line from the center of the reference pixel or texel to the center of the adjacent pixel or texel, and counts the number of times that line crosses one of the detected edges. If the number of line crossings is even or zero, the pixels or texels are assumed to be in the same region, and a value that indicates the pixels or texels are in the same region is assigned to a corresponding bit. If the number of line crossings is odd, the pixels or texels are assumed to be in different regions, and a value that indicates the pixels or texels are not in the same region is assigned to the corresponding bit. As such, for any particular pixel or texel of adjacency field 724, each bit represents whether that pixel or texel is considered to be in the same region as a corresponding adjacent pixel or texel.

Figure 8:
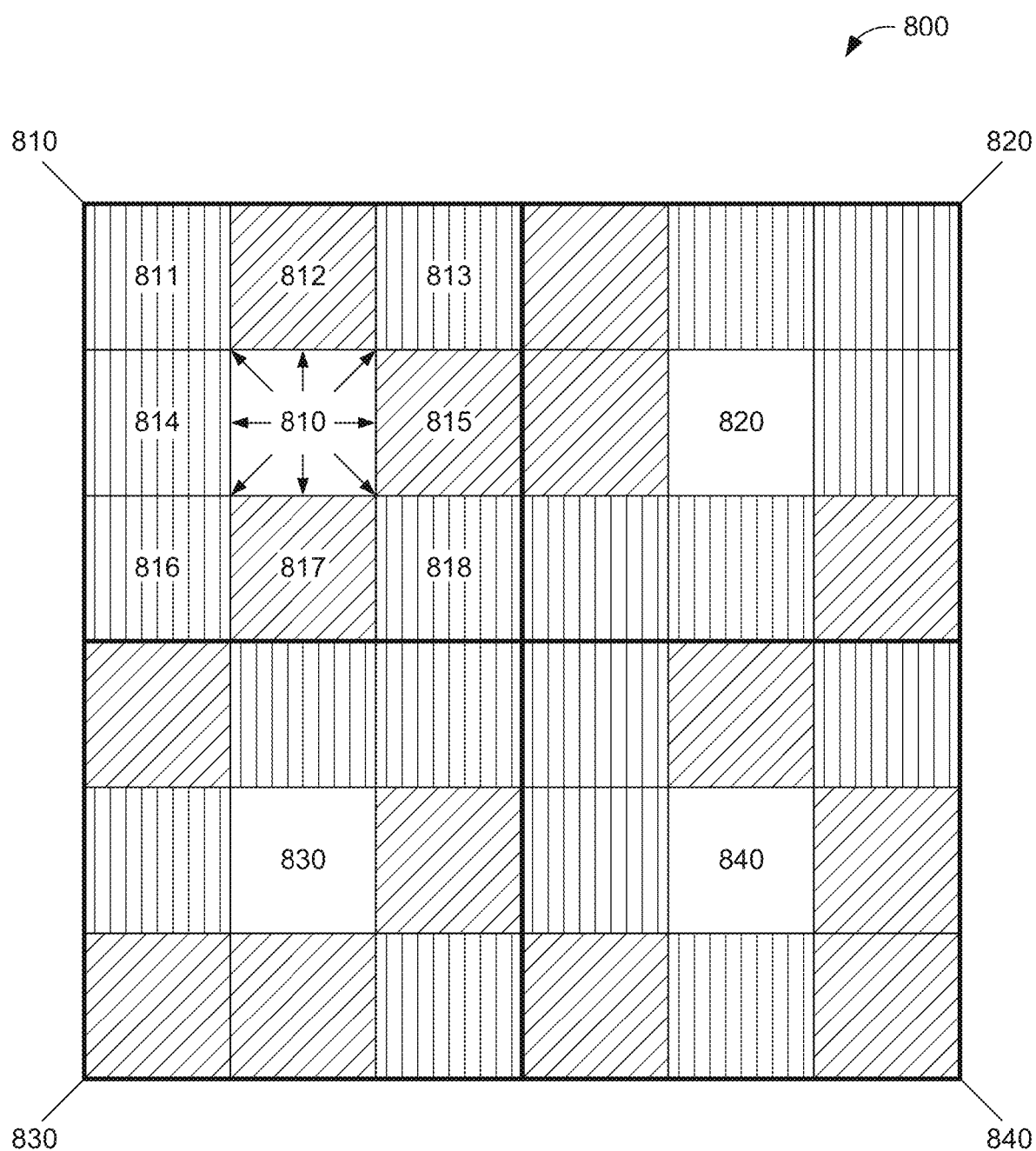
FIG. 8 is an illustration of a portion of an example adjacency field, in accordance with various embodiments.

FIG. 8 is an illustration of a portion of an example adjacency field 800, in accordance with various embodiments. More specifically, adjacency field 800 is illustrated with four pixels or texels 810, 820, 830, and 840. Each pixel or texel 810, 820, 830, and 840 is illustrated as being sub-divided to represent 8 bits for each pixel or texel (not including the center square). For example, pixel or texel 810 stores bits 811, 812, 813, 814, 815, 816, 817, and 818. Each of bits 811-818 stores a binary value (illustrated in FIG. 8 as different shading patterns) representing whether pixel 810 is considered to be in the same region as a corresponding adjacent pixel or texel or not. For example, bit 815 represents whether pixel or texel 810 is in the same region as pixel or texel 820, bit 818 represents whether pixel or texel 810 is in the same region as pixel or texel 840, and bit 817 represents whether pixel or texel 810 is in the same region as pixel or texel 830. Bits 811-814 and 816 represent whether pixel or texel 810 is in the same region as pixels or texels that are not illustrated in FIG. 8 (e.g., pixels or texels to the top left, top, top right, left, and bottom left of pixel or texel 810, respectively).

Returning now to FIG. 7, color field generator 716 samples unblended color values from raster content 726 to generate color field 726. In some embodiments, this is accomplished for each reference pixel or texel by performing a weighted median (or some other measure) to choose which pixel or texel in a neighborhood of the reference pixel or texel to sample from, favoring pixels or texels on the same side of a detected edge (polyline). In an example implementation, color field generator 716 determines a color value for each pixel or texel of color field 726 (the reference pixel or texel) considering some neighborhood of the reference pixel or texel (e.g., a circle, square, or other shape of any suitable size). Color field generator 716 determines a weight comprising a sign and a magnitude for each pixel or texel in the neighborhood. In some embodiments, the sign is determined based on whether the reference pixel or texel and the neighboring pixel or texel are in the same region. In some implementations, this adjacency information is represented in adjacency field 724, so color field generator 716 looks up the adjacency information from adjacency field 724, and applies a corresponding sign for the weight (e.g., positive for same region, negative for different regions). The magnitude for the weight is determined based on the unsigned distance to the nearest detected edge (e.g., from unsigned distance field 722), distance between each pixel or texel in the neighborhood and the reference pixel or texel, difference in color values, difference in intensities, and/or other factors.

More specifically, in embodiments that use unsigned distance to the nearest detected edge in the weight magnitude, for points where the unsigned distance gets lower, those points are more likely at an edge where blurring or blending of adjacent colors is likely to occur. Thus, using unsigned distance to the nearest detected edge in the magnitude can serve to disfavor colors that are close to detected edges. In embodiments that use distance between the neighboring pixel or texel and the reference pixel or texel in the weight magnitude, neighboring pixels or texels that are farther away are less likely to have color values representative of the reference pixel. Thus, using (e.g., the inverse of) distance between neighbors in the magnitude can serve to disfavor sampling far from a reference pixel. In embodiments that use difference in color values (e.g., distance in RGB space) in the weight magnitude, larger distances can indicate greater differences in color, which are less likely to be representative of the reference pixel or texel. Thus, using (e.g., the inverse of) difference in color values in the magnitude can serve to disfavor sampling from pixels or texels with substantially different color values than the reference pixel or texel. In some embodiments, one or more elements of the weight magnitude are embedded in corresponding functions (e.g., a square or root of unsigned distance, applying some scalar multiplier, etc.), and different contribution(s) are combined (e.g., added) to determine the weight magnitude for each pixel or texel in the neighborhood.

Having determined a magnitude and sign for a weight for each pixel or texel in the neighborhood, color field generator 716 performs a weighted median (or some other measure) to choose which pixel or texel in the neighborhood to sample from. Color field generator 716 then samples a color value from raster content 721 corresponding to the winning pixel or texel in the neighborhood, and assigns that color value to the reference pixel or texel in color field 726. In some embodiments, a color value sampled from the neighborhood using a weighted median is blended with the original color value of the reference pixel or texel. For example, a mixing ratio between the color values and/or the contribution of the original color value to the mixing ratio is proportional to, weighted by, or otherwise determined based on, the magnitude of the image gradient (e.g., vector pointing to the largest intensity increase) at the reference or sampled pixel or texel, unsigned distance between the reference pixel or texel and the nearest polyline, and/or other factors. Blending according to image gradient/unsigned distance can serve to use more of the original color values in areas with low gradient/ larger distance field values, which are further from edges and therefore less likely to be mixes of colors from two or more regions. Color field generator 716 repeats the process for all pixels or texels in color field 726. Although some embodiments are described as using a color field, "color" field 726 does not have to represent color and can additionally or alternatively represent arbitrary data, coordinates of some other field to be sampled at a later time (e.g., using deferred shading or rendering), and/or other data.

Figure 9:
FIG. 9 illustrates edge detection applied to an example raster image, in accordance with various embodiments.
Figure 9:
Figure 10:
FIG. 10 illustrates example scalar fields that can be used to represent and scale raster content, in accordance with various embodiments.
Figure 10:
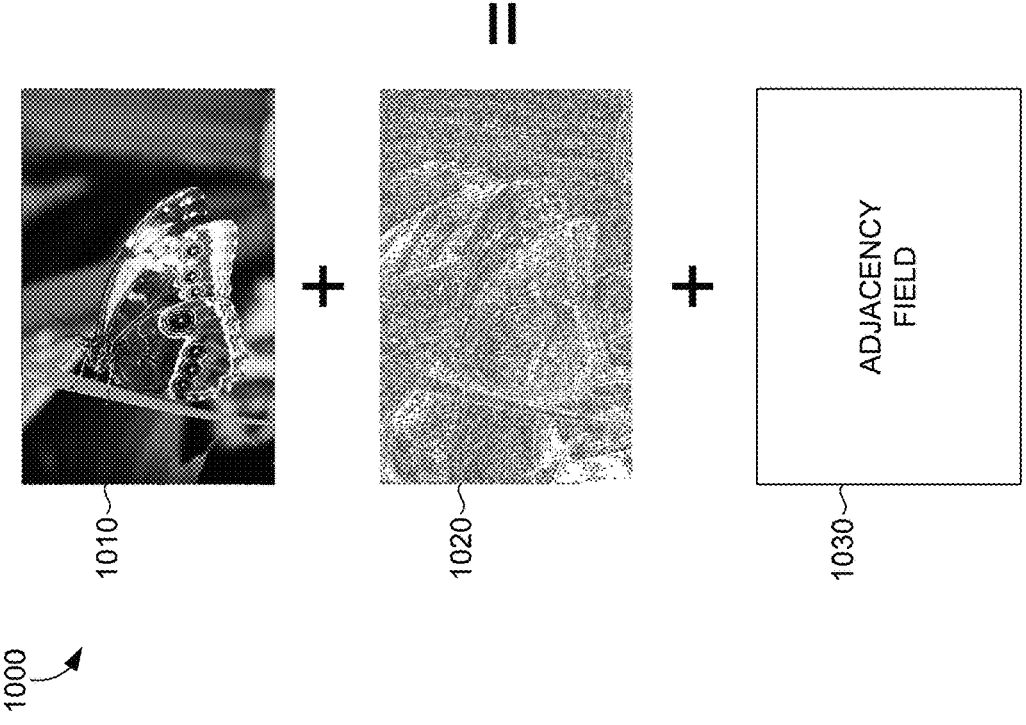
Figure 11:
FIG. 11 illustrates magnified regions of example color fields representing raster content, in accordance with various embodiments.
Figure 11:
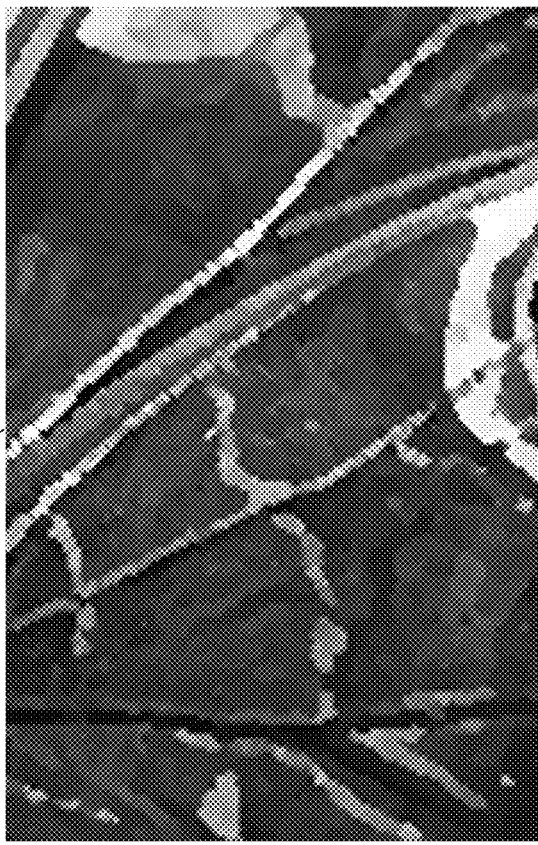

FIGS. 9-11 illustrate an example raster image and corresponding scalar fields that can be used to represent and scale raster the example raster image. FIG. 9 illustrates raster image 910 of a butterfly and detected edges 920 from raster image 910. FIG. 10 illustrates example scalar fields that can be used to represent and scale raster image 910. In this example, raster image 910 of FIG. 9 is represented by color field 1010, unsigned distance field 1020, and adjacency field 1030. Color field 1010 represents color values sampled from the raster image 910. Unsigned distance field 1020 represents the absolute distance from any point to the nearest detected edge (polyline), and has been companded for illustration purposes. Adjacency field 1030 represents whether adjacent pixels are in the same region and has been simplified for illustration purposes. Image 1040 is a representation of what a rendering based on color field 1010, unsigned distance field 1020, and adjacency field 1030 would look like.

FIG. 11 illustrates magnified regions 1110 and 1120 of example color fields representing raster image 910. Magnified region 1110 (which corresponds to color field 1010 of FIG. 10) represents a portion of a color field generated using a weighted median to sample color values from raster image 910. Magnified region 1120 represents a portion of a color field that blends original color values from raster image 910 with the weighted median according to the image gradient of raster image 910, producing sharper edges than in magnified region 1110. Generally, color fields produced by blending the weighted median with original color values should produce more perceptually natural edges over using the weighted median alone.

As such, and returning to FIG. 7, texture computation component 710 generates and stores some representation of unsigned distance field 722, adjacency field 724, and/or color field 726. Generally, an image, texture, scalar field, and/or some representation thereof can include, store, identify, or otherwise support multiple elements (e.g., channels, tags, etc.) for each pixel or texel. As a result, depending on the implementation, texture computation component 710 generates, stores, identifies, and/or otherwise represents any number of images, textures, and/or scalar fields using any number of data structures and/or files. For example, in some embodiments, unsigned distance field 722, adjacency field 724, and/or color field 726 are stored in one or more files or data structures, hosted on server 705, baked to disk, and/or otherwise associated with raster content 721. Generally, texture computation component 710 (or some portion thereof) is executed on one or more CPUs, one or more GPUs, or some combination thereof.

In some embodiments, raster content 721 (e.g., in the form of its associated unsigned distance field 722, adjacency field 724, and/or color field 726) are made available to an application or framework (e.g., application or framework 755 of client device 750) and/or GPU 760 for rendering, as described in more detail with respect to FIG. 1. In some implementations, the rendering process used by GPU 760 of FIG. 7 corresponds with the rendering process described above with respect to GPU 160 of FIG. 1, but with differences that account for the different dimensionalities of region ID field 124 (vector content rendering) and adjacency field 724 (raster content scaling). For example, when synthesizing a partial signed distance field, instead of determining whether pixels or texels are in the same region by looking up and comparing region IDs from region ID field 124 to determine whether to assign a positive or negative distance value as in in the vector content rendering technique, in some implementations of the raster content scaling technique, color sampling tool 780 (e.g., partial signed distance field synthesizer 782) determines the sign by looking up an appropriate bit from adjacency field 724. Furthermore, to accommodate gradients, instead of simply sampling the color value of the winning texel from color field 726, in some embodiments, color sampling tool 780 (e.g., sample selector 786) identifies all the pixels (or texels) from the local neighborhood that are in the same region by looking up an appropriate bit from adjacency field 724, interpolates color values for those pixels or texels from the local neighborhood that are in the same region (e.g., using bilinear interpolation), and returns the interpolated color value.

As such, GPU 760 generates a bitmap using color sampling tool 780 to identify color values and outputs the resulting bitmap to a display. In the embodiment illustrated in FIG. 7, GPU 760 includes display interface 792, which provides output data (e.g., a scaled raster image) to a data target, such as a graphical user interface of application or framework 755, a display device, a printer, and/or some other component. In some embodiments in which the data target includes a display device, GPU 760 drives the display by repetitively providing output data (e.g., an updated raster image from a screen buffer, such as buffer(s) 190) at a designated rate. In some embodiments, GPU 760 repetitively generates scaled versions of raster content 721 during a zoom operation (e.g., infinite zooming). Accordingly, GPU 760 uses pre-computed textures to render one or more scaled versions of raster content 721 that maintain sharp, curved edges between regions. In embodiments in which GPU 760 is executing a high speed rendering loop (e.g., 60 fps), using pre-computed textures removes those computations from the rendering loop, reducing the cost of rendering.

Figure 12:
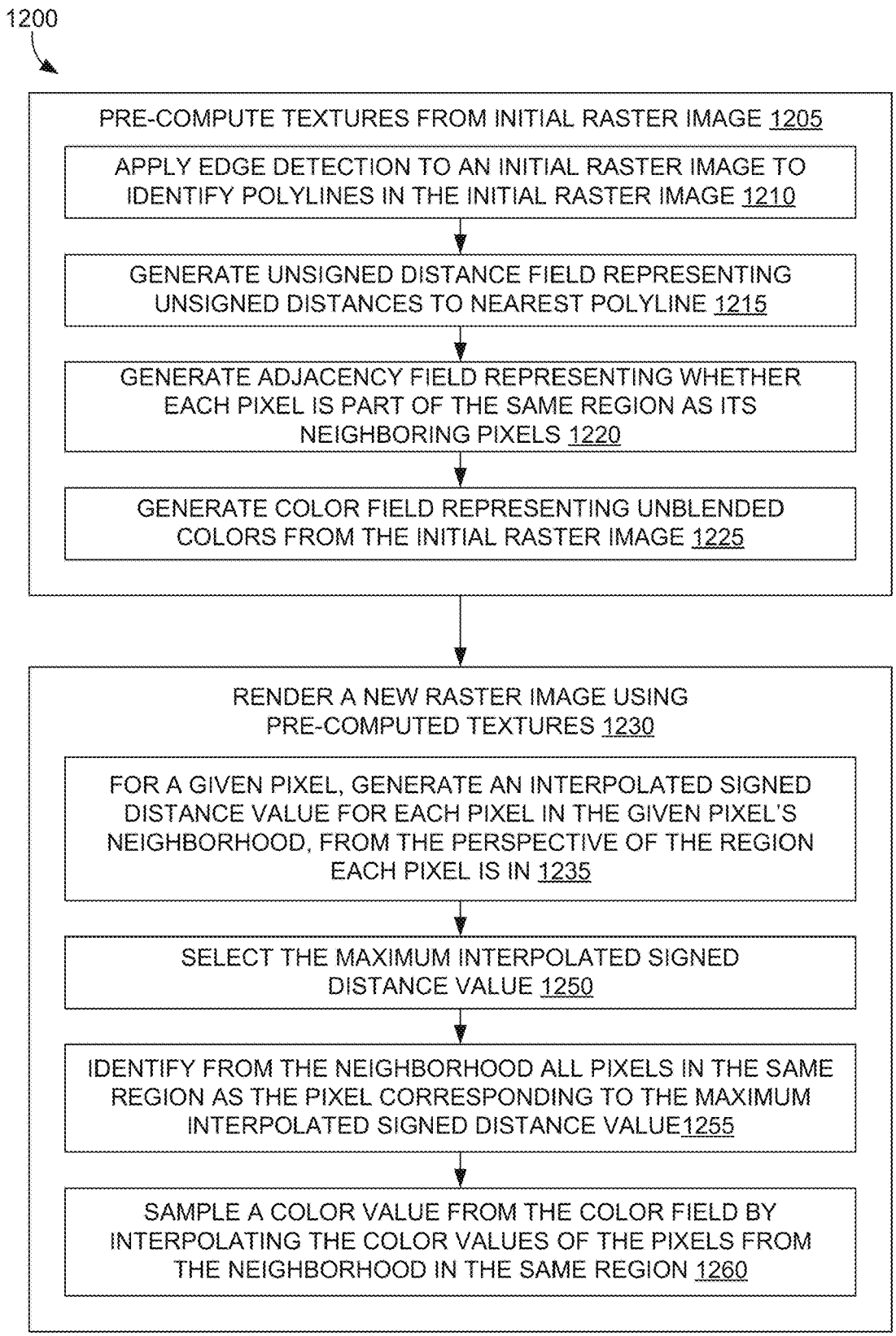
FIG. 12 is a flow diagram showing a method for rendering a new raster image from an initial raster image using pre-computed textures, in accordance with various embodiments.
Figure 13:
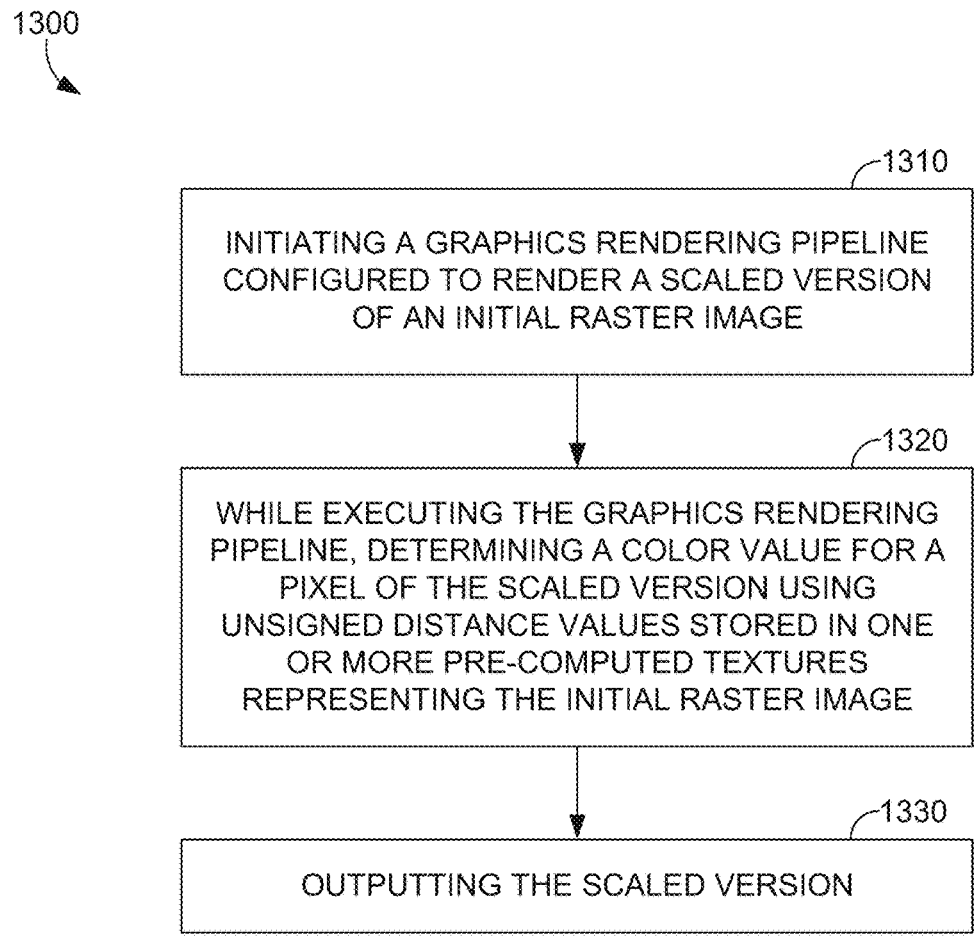
FIG. 13 is a flow diagram showing a method for rendering a scaled version of an initial raster image using pre-computed textures, in accordance with various embodiments.
Figure 14:
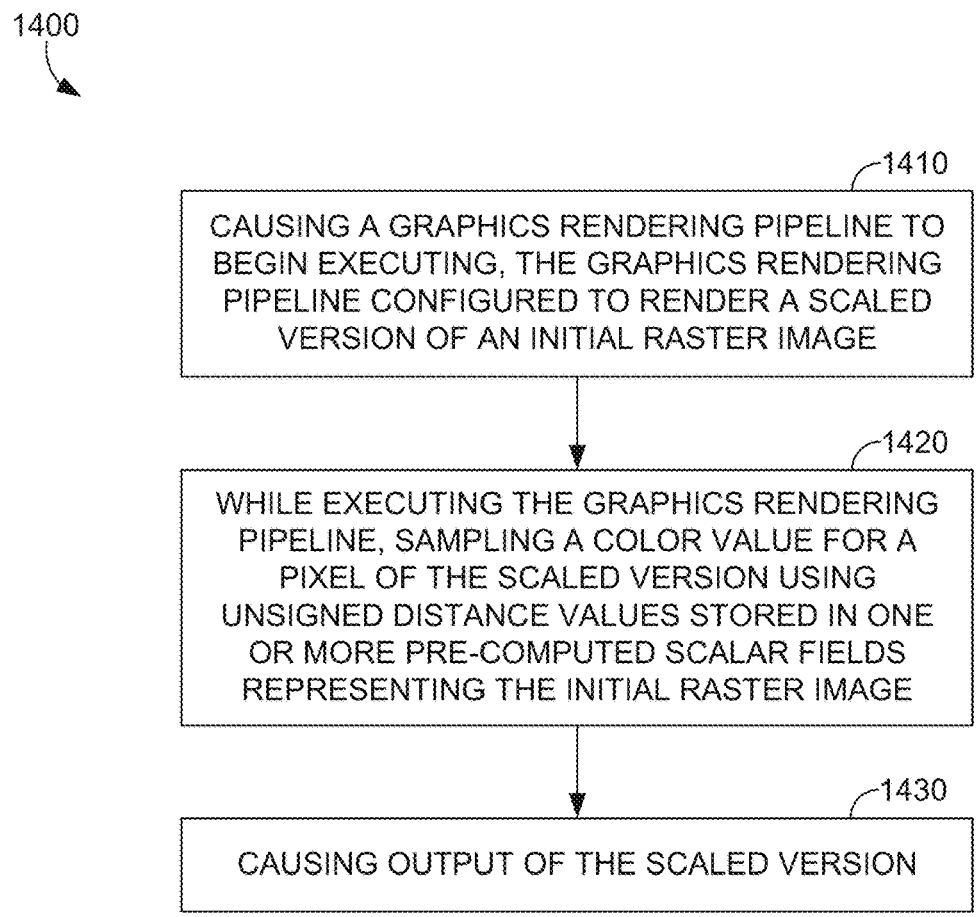
FIG. 14 is a flow diagram showing a method for rendering a scaled version of an initial raster image using pre-computed scalar fields, in accordance with various embodiments.

With reference now to FIGS. 12-14, flow diagrams are provided illustrating methods for rendering a scaled version of raster content. Each block of the methods 1200, 1300, and 1400 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning to FIG. 12, FIG. 12 illustrates a method 1200 for rendering a new raster image from an initial raster image using pre-computed textures, in accordance with various embodiments. Initially at block 1205, textures are pre-computed from an initial raster image. Although the term texture is used here, it should be understood to include any suitable representation of a scalar field (e.g., image or texture). Here, pre-computation refers to the fact that it occurs prior to rendering in block 1230. Blocks 1210-1225 illustrate a possible way of performing at least a portion of block 1205. For example, at block 1210, edge detection is applied to an initial raster image to identify polylines in the initial raster image (e.g., as described above with respect to texture computation component 710 of FIG. 7). At block 1215, an unsigned distance field representing unsigned distances to the nearest polyline is generated (e.g., as described above with respect to unsigned distance computation component 712 of FIG. 7). At block 1220, an adjacency field representing whether each pixel (or texel) is part of the same region as its neighboring pixels is generated (e.g., as described above with respect to adjacency field generator 716 of FIG. 7). At block 1225, a color field is generated representing unblended colors from the initial raster image (e.g., as described above with respect to color field generator 716 FIG. 7).

At block 1230, a new raster image is rendered using the pre-computed textures. Blocks 1235-1260 illustrate a possible way of performing at least a portion of block 1230. In an example embodiment, a CPU and/or a GPU executes a graphics rendering loop, using any known vertex processing and rasterization technique to generate fragments (e.g., from the pre-computed textures), using any known technique to identify pixels corresponding to each fragment, and using blocks 1235-1260 to identify a color value for each of one or more output pixels. For example, to generate a color value for a given output pixel, initially at block 1235, an interpolated signed distance value is generated for each pixel (or texel) in the given pixel's neighborhood, from the perspective of the region each pixel (or texel) is in. Note, each interpolated signed distance value could be considered to correspond to a pixel of an output image, a texel of an input texture, and/or a pixel or texel of some synthesized field. At block 1250, the maximum interpolated signed distance value is selected. At block 1255, all pixels in the same region as the pixel corresponding to the maximum interpolated signed distance value are identified from the neighborhood. At block 1260, a color value is sampled from the color field by interpolating color values of the pixels from the neighborhood in the same region. That interpolated color value is designated for the output pixel being rendered. Generally, blocks 1235-1260 are repeated any number of times, each time identifying a color value for a particular output pixel. As such, in some embodiments, a bitmap is output (e.g., to a display) using the identified color values.

Turning now to FIG. 13, FIG. 13 illustrates a method 1300 for rendering a scaled version of an initial raster image using pre-computed textures, in accordance with various embodiments. Initially at block 1310, a graphics rendering pipeline configured to render a scaled version of an initial raster image is initiated. At block 1320, while executing the graphics rendering pipeline, a color value is determined for a pixel of the scaled version using unsigned distance values stored in one or more pre-computed textures representing the initial raster image. In an example embodiment, block 1320 is repeated to determine color values for multiple pixels of the scaled version of the initial raster image. At block 1330, the scaled version is output.

Turning now to FIG. 14, FIG. 14 illustrates a method 1400 for rendering a scaled version of an initial raster image using pre-computed scalar fields, in accordance with various embodiments. Initially at block 1410, a graphics rendering pipeline is caused to begin executing. The graphics rendering pipeline is configured to render a scaled version of an initial raster image. At block 1420, while executing the graphics rendering pipeline, a color value for a pixel of the scaled version is sampled using unsigned distance values stored in one or more pre-computed scalar fields representing the initial raster image. In an example embodiment, block 1420 is repeated to determine color values for multiple pixels of the scaled version of the initial raster image. At block 1430, the scaled version is output.

Example Operating Environment

Figure 15:
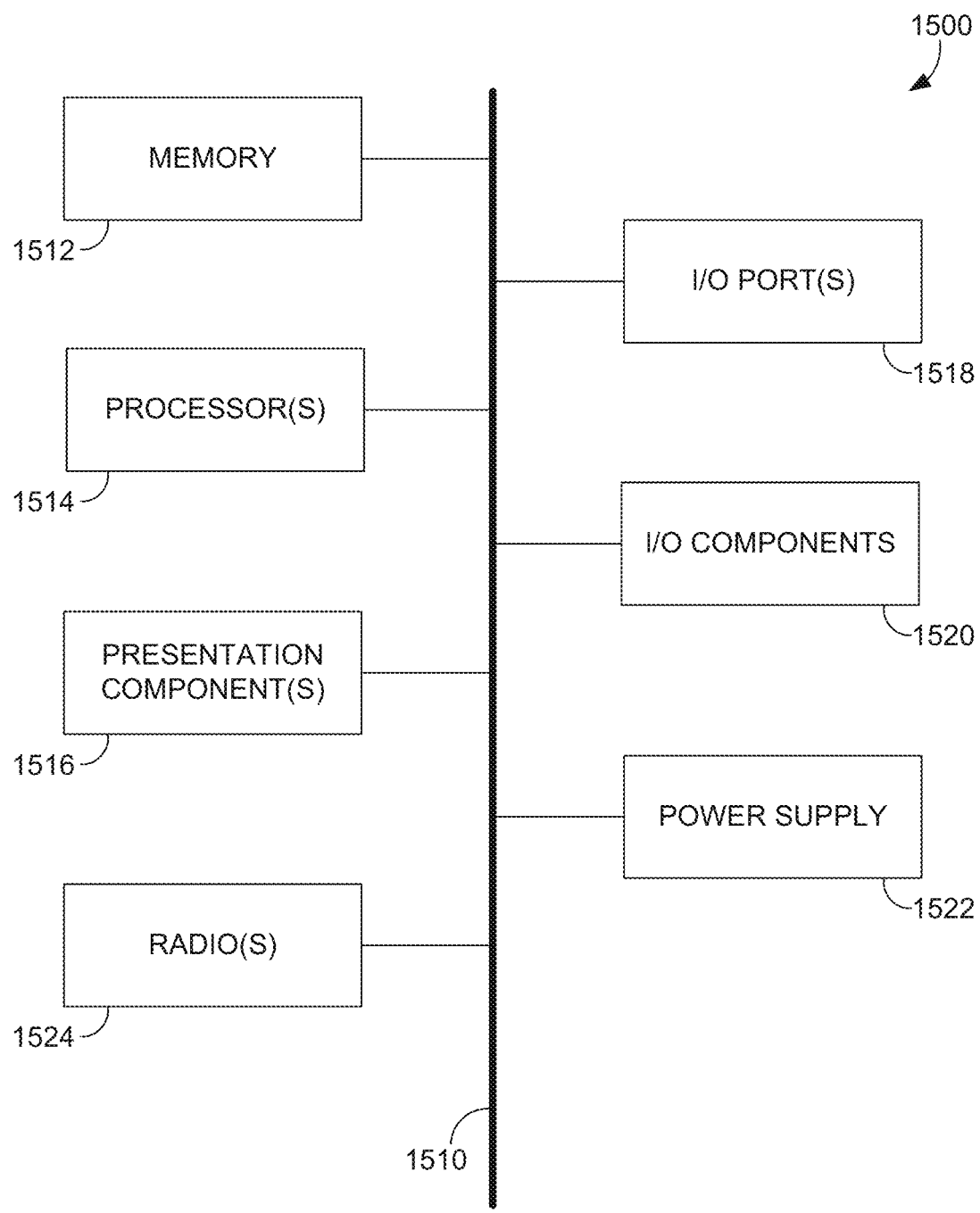
FIG. 15 is a block diagram of an example computing environment suitable for use in implementing various embodiments.

Having described an overview of embodiments of the present invention, an example operating environment in which some embodiments of the present invention are implemented is described below in order to provide a general context for various aspects of the present invention. Referring now to FIG. 15 in particular, an example operating environment for implementing embodiments of the present invention is shown and designated generally as computing device 1500. Computing device 1500 is but one example of a suitable computing environment and is not intended to suggest any limitation as to the scope of use or functionality of the invention. Neither should computing device 1500 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 15, computing device 1500 includes bus 1510 that directly or indirectly couples the following devices: memory 1512, one or more processors 1514, one or more presentation components 1516, input/output (I/O) ports 1518, input/output components 1520, and illustrative power supply 1522. Bus 1510 represents what may be one or more busses (such as an address bus, data bus, or combination thereof). Although the various blocks of FIG. 15 are shown with lines for the sake of clarity, in some cases, it is not possible to delineate clear boundaries for different components. In this case, metaphorically, the lines would be grey and fuzzy. As such, the diagram of FIG. 15 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 15 and a "computing device."

Computing device 1500 typically includes a variety of computer-readable media. Computer-readable media can be any available media that can be accessed by computing device 1500 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Example presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc. The I/O components 1520 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 1500. In some cases, computing device 1500 is equipped with depth cameras, such as stereoscopic camera systems, infrared camera systems, RGB camera systems, touchscreen technology, and combinations of these, for gesture detection and recognition. Additionally or alternatively, the computing device 1500 is equipped with accelerometers or gyroscopes that enable detection of motion, and in some cases, an output of the accelerometers or gyroscopes is provided to the display of computing device 1500 to render immersive augmented reality or virtual reality.

Embodiments described herein support rendering image content. The components described herein refer to integrated components of a rendering system. The integrated components refer to the hardware architecture and software framework that support functionality using the rendering system. The hardware architecture refers to physical components and interrelationships thereof and the software framework refers to software providing functionality that can be implemented with hardware embodied on a device.

In some embodiments, the end-to-end software-based system operates within the components of the rendering system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   prior to receiving an instruction to render multicolor vector content into a raster image, generating: a first pre-computed texture representing unsigned distance values, a second pre-computed texture representing region identification values that identify which enclosed region defined by the multicolor vector content each texel is in, and a third pre-computed texture representing color values of the multicolor vector content;
   while executing a graphics rendering pipeline in response to the instruction, determining a color value for a pixel of the raster image using the first, second, and third pre-computed textures; and
   outputting the raster image.

2. The one or more computer storage media of claim 1, wherein determining the color value for the pixel comprises:
   synthesizing a signed distance field by pairing the unsigned distance values stored in the first pre-computed texture with signs determined by comparing the region identification values stored in the second pre-computed texture;
   sampling an interpolated signed distance value from the signed distance field; and
   sampling the color value from a corresponding texel of the third pre-computed texture.

3. The one or more computer storage media of claim 1, wherein determining the color value for the pixel comprises generating a plurality of interpolated signed distance values from a perspective of different regions in a neighborhood of the pixel and sampling the color value from a texel of the third pre-computed texture corresponding to a maximum of the plurality of interpolated signed distance values.

4. The one or more computer storage media of claim 1, wherein the first pre-computed texture comprises texels that each store a corresponding one of the unsigned distance values quantifying absolute distance between the texel and a nearest boundary between enclosed regions represented by the multicolor vector content.

5. The one or more computer storage media of claim 1, wherein generating the second pre-computed texture comprises performing a connected components analysis to identify enclosed regions of the multicolor vector content and assigning the region identification values to the enclosed regions.

6. The one or more computer storage media of claim 1, wherein the third pre-computed texture comprises texels that each store a corresponding one of the color values generated by rasterizing the multicolor vector content.

7. The one or more computer storage media of claim 1, wherein the operations are part of a shader program configured to determine the color value on a graphics processing unit.

8. A computerized method comprising:
   prior to receiving an instruction to render a raster image from multicolor vector content, generating: a first pre-computed scalar field representing unsigned distance values, a second pre-computed scalar field representing region identification values that identify which enclosed region defined by the multicolor vector content each element of the second pre-computed scalar field is in, and a third pre-computed scalar field representing color values of the multicolor vector content;
   while executing a graphics rendering pipeline in response to the instruction, sampling a color value for a pixel of the raster image using the first, second, and third pre-computed scalar fields; and
   causing output of the raster image.

9. The computerized method of claim 8, wherein sampling the color value for the pixel comprises:
   synthesizing a signed distance field by pairing the unsigned distance values stored in the first pre-computed scalar field with signs determined by comparing the region identification values stored in the second pre-computed scalar field;
   sampling an interpolated signed distance value from the signed distance field; and sampling the color value from a corresponding element of the third pre-computed scalar field.

10. The computerized method of claim 8, wherein sampling the color value for the pixel comprises generating a plurality of interpolated signed distance values from a perspective of different regions in a neighborhood of the pixel and sampling the color value from an element of the third pre-computed scalar field corresponding to a maximum of the plurality of interpolated signed distance values.

11. The computerized method of claim 8, wherein the first pre-computed scalar field comprises elements that each store a corresponding one of the unsigned distance values quantifying absolute distance between a point and a nearest boundary between enclosed regions represented by the multicolor vector content.

12. The computerized method of claim 8, wherein generating the second pre-computed scalar field comprises performing a connected components analysis to identify enclosed regions of the multicolor vector content and assigning the region identification values to the enclosed regions.

13. The computerized method of claim 8, wherein the third pre-computed scalar field comprises elements that each store a corresponding one of the color values generated by rasterizing the multicolor vector content.

14. The computerized method of claim 8, wherein sampling the color value is part of a shader program configured to execute on a graphics processing unit.

15. A computer system comprising one or more hardware processors configured to execute computer program instructions that cause the one or more hardware processors to perform operations comprising:
  prior to receiving an instruction to render multicolor vector content into a raster image, generating: a pre-computed unsigned distance field representing unsigned distance values, a pre-computed region identification field representing region identification values that identify which enclosed region defined by the multicolor vector content each element of the pre-computed region identification field is in, and a pre-computed color field representing color values of the multicolor vector contents;
  while executing a graphics rendering pipeline in response to the instruction, determining a color value for a pixel of the raster image using the pre-computed unsigned distance field, the pre-computed region identification field, and the pre-computed color field; and
  causing output of the raster image.

16. The computer system of claim 15, wherein the one or more hardware processors comprise graphics processing unit and the operations are part of a shader program configured to determine the color value using the graphics processing unit.

17. The computer system of claim 15, wherein determining the color value for the pixel comprises generating a plurality of interpolated signed distance values from a perspective of different regions in a neighborhood of the pixel and sampling the color value from an element of the pre-computed color field corresponding to a maximum of the plurality of interpolated signed distance values.

18. The computer system of claim 15, wherein the pre-computed unsigned distance field comprises elements that each store a corresponding one of the unsigned distance values quantifying absolute distance between a point and a nearest boundary between enclosed regions represented by the multicolor vector content.

19. The computer system of claim 15, wherein generating the pre-computed region identification field comprises performing a connected components analysis to identify enclosed regions of the multicolor vector content and assigning the region identification values to the enclosed regions.

20. The computer system of claim 15, wherein the pre-computed color field comprises elements that each store a corresponding one of the color values generated by rasterizing the multicolor vector content.

\* \* \* \* \*